United States Patent
Liang et al.

(10) Patent No.: US 7,193,983 B2
(45) Date of Patent: Mar. 20, 2007

(54) PATH DIVERSITY EQUALIZATION CDMA DOWNLINK RECEIVER

(75) Inventors: Ying-Chang Liang, Singapore (SG); Po Shin Francois Chin, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 1162 days.

(21) Appl. No.: 10/052,117

(22) Filed: Jan. 17, 2002

(65) Prior Publication Data

US 2003/0133424 A1    Jul. 17, 2003

(51) Int. Cl.
H04B 7/216    (2006.01)
(52) U.S. Cl. .................. 370/335; 370/342; 375/229
(58) Field of Classification Search ............... None
See application file for complete search history.

(56) References Cited

U.S. PATENT DOCUMENTS

| | | | | |
|---|---|---|---|---|
| 6,741,643 | B1 * | 5/2004 | McGibney | 375/229 |
| 2001/0036228 | A1 * | 11/2001 | Skafidas et al. | 375/232 |
| 2002/0060999 | A1 * | 5/2002 | Ma et al. | 370/335 |
| 2005/0169361 | A1 * | 8/2005 | Yousef et al. | 375/233 |

OTHER PUBLICATIONS

Ghauri and D. Slock, "Linear Receivers For DS-CDMA Downlink Exploiting Orthogonality Of Spreading Sequences", Proc. of Asilomar Conf. On Signals, Systems and Computers, pp. 650-654, Nov. 1998.

K. Hooli, M. Latva-aho and M. Juntti, "Multiple Access Interference Suppression With Linear Chip Equalization In WCDMA Downlink Receivers", Proc. of Globecom'99, pp. 467-471, Dec. 1999.

M. Heikkila, P. Komulainen and J. Lilleberg, "Interference Suppression In CDMA Downlink Through Adaptive Channel Equalization", Proc. of VTC'Fall-99, pp. 978-982, Sep. 1999.

K. Li and H. Liu, "A New Blind Receiver For Downlink DS-CDMA Communications", IEEE Communications Letters, vol. 3, No. 7, pp. 193-195, Jul. 1999.

F. Petre, M. Moonen, M. Engels, B. Gyselinckx and H. Man, "Pilot-Aided Adaptive Chip Equalizer Receiver For Interference Suppression In DS-CDMA Forward Link", Proc. of VTC-Fall'2000, 2000.

Ying-Chang Liang, "A Code Division Multiple Access Downlink Receiver", U.S. Appl. No. 09/981,531, filed Oct. 17, 2001 (57 p.).

* cited by examiner

*Primary Examiner*—Duc Ho
(74) *Attorney, Agent, or Firm*—Conley Rose, P.C.

(57) ABSTRACT

A code division multiple access downlink receiver for providing wireless communication via a wireless channel between a base station and a mobile station in which the receiver is implemented. The receiver comprises a plurality of subchannels of which each conveys at least one signal received from the base station, and a cell searcher for receiving signals in the plurality of subchannels and retrieving therefrom a common code relating to a cell. The receiver also comprises a code generator for generating a set of common and dedicated codes relating to at least one communication channel using the output of the cell searcher, and a plurality of equalizers for receiving the code generator output and equalizing the received signals in the plurality of subchannels, in which each of the plurality of equalizers includes a plurality of filters in which each of the plurality of filters corresponds to each of the plurality of subchannels, in which the length of each of the plurality of filters is lesser than the length of each of the plurality of subchannels.

32 Claims, 13 Drawing Sheets

PATH DIVERSITY EQUALIZATION CDMA DOWNLINK RECEIVER

FIELD OF INVENTION

The present invention relates generally to wireless communications systems, and more particularly to wireless communications equalization receivers for use in code division multiple access (CDMA) communications systems.

BACKGROUND

Wireless communications systems are becoming the preferred choices for the provision of transmission services for digital voice, video and data. Code division multiple access (CDMA) technology is one of the effective wireless access technologies for supporting variable and high data rate transmission services. As an example, wideband CDMA (WCDMA) is adopted in the standardization of the third generation partnership project (3GPP).

It is therefore envisaged that there is substantial business potential in the provision of Internet services through wireless communications. In the wireless Internet domain, most of the data is transferred from a base station (BS) to a mobile station (MS), thus making downlinks the dominant traffic link in the wireless Internet domain. This situation is also true of other data transmission applications, e.g., wireless multimedia communications. Therefore, it is important that the performance of downlinks in wireless communications systems, in particular CDMA-based systems, is improved.

In the downlinks of CDMA-based systems, all mobile stations within the same cell or sector use the same frequency bands and time slots but different spreading codes for data transmission. Spreading codes consist of two layers of codes, namely long scrambling and short channelization codes. The long scrambling codes are common codes assigned to all mobile stations within the same cell or sector. However, the mobile stations are allocated unique short channelization codes which are dedicated codes orthogonal to each other. To support multi-data rate transmissions in CDMA-based systems, two spreading methods may be used, namely the multi-code (MC) and orthogonal variable spreading factor (OVSF) methods.

Communication channels allocated to the mobile stations are referred to as downlink traffic channels (DTCHs), through which data symbols intended for the respective mobile stations are conveyed. In order to establish and maintain the connections between the base stations and mobile stations, common channels, namely a common pilot channel (CPICH) and a common control channel (CCPCH), are also allocated to each cell or sector for conveying the relevant information shared by all the mobile stations within the same cell or sector. The data symbols conveyed by DTCHs, CPICH and CCPCH are orthogonally spread using spreading codes into data-bearing spread signals, then synchronously multiplexed, and finally transmitted through the same physical medium as a transmitted signal. In multi-data rate transmissions, the orthogonality between the spreading codes for low- and high-data rate DTCHs and the CPICH and CCPCH is maintained.

There may be many tall obstacles such as buildings and hills situated between base stations and a mobile station, and a wireless channel is therefore well modeled as a wide-sense stationary uncorrelated scattering (WSSUS) channel. In a CDMA downlink transmission system, a transmitted signal arrives at a mobile station together with several time-delayed, amplitude-scaled variants of the transmitted signal which travel along multiple paths in the wireless channel. A CDMA receiver resolves the multipath wireless channel into several paths which convey these multipath signals known as rays, the time delays of which are multiples of a spread signal chip interval $T_c$, and each ray is subject to statistically independent Rayleigh fading. The resolved ray with time delay $\tau$ represents a group of multipath signals with time delays over an interval $[\tau-T_c/2, \tau+T_c/2]$. If there is only one resolved ray, a frequency non-selective fading channel is observed. However, if there is more than one resolved ray, the wireless channel is called a frequency selective fading channel.

If the wireless channel is frequency non-selective, data symbols may be recovered at the mobile station using a conventional despreader without any intra-cell interference. However, a wireless channel is practically frequency selective because of the large time dispersion or time difference between the multipath signals arriving at the mobile station.

A conventional CDMA receiver in a mobile station employs a Rake combiner to coherently combine the despread outputs from all resolved rays determined by a path searcher, thereby recovering the transmitted signal.

A Rake receiver provides for path diversity and captures all resolved rays. However, there are two kinds of interference associated with a Rake receiver for CDMA downlink transmission, namely inter-finger interference (IFI) and multiple access interference (MAI), both of which are due to the frequency selectivity of the wireless channel. The capacity of a CDMA system with Rake receivers is limited by IFI and MAI.

In order to improve the performance of CDMA downlink transmission, CDMA receivers that provide for suppression of IFI and MAI are needed. When the delay dispersion is large, a frequency selective fading channel may be transformed into a frequency non-selective fading channel through channel equalization. Therefore, equalization receiver is an effective CDMA receiver for recovering data symbols by restoring the orthogonality of the spreading codes, thus suppressing both IFI and MAI.

FIG. 1 shows a block diagram of a conventional equalization receiver 100 in a mobile station for CDMA downlink transmission. The conventional equalization receiver 100 includes a cell searcher 102, a code generator 104, a path searcher 106, a despreader 110, an equalizer 108, and a signal detector 112.

In the equalization receiver 100, the cell searcher 102 receives from a CDMA downlink system a transmitted signal and any corresponding rays using multiple antennas that may employ oversampling, and retrieves therefrom long scrambling codes relating to a cell or sector in which the equalization receiver 100 operates, and information relating to cell and frame synchronization. The code generator 104 using the long scrambling codes retrieved by the cell searcher 102, generates a combination of long scrambling and short channelization codes known as spreading codes relating to the common channels CPICH, CCPCH and the corresponding DTCH required by the equalizer 108. The path searcher 106 then provides the time delay parameters of several rays with largest received powers by using the data symbols intended for the CPICH, which is known to the equalization receiver 100, the long scrambling and short channelization codes, and the received signals.

The equalizer 108 is described in greater detail with reference to FIG. 2, where there are M physical channels obtained using multiple receiver antennas that may employ oversampling, each of which is defined as a subchannel that includes a linear finite impulse response (FIR) $h_j(n)$ with maximum delay relating to L number of taps. For example, M=4 physical channels may be achieved via four receiver antennas without over-sampling, or via two receiver antennas, each of which employs 2-times over-sampling.

In the equalizer 108, there are M linear FIR filters 202, $g_j(n)$, each corresponding to a physical channel with response $h_j(n)$. During operation, a received signal received via a physical channel j is passed to into a corresponding FIR filter 202 of length G thereby producing a filtering output $z_j(n)$. A signal combiner 204 then sums the output from each FIR filter 202, generating an equalization output signal $z(n)$ for further processing by the despreader 110. Equalizer coefficients used in the equalizer 108 may be obtained, for example, by minimizing the difference, using the minimum mean-square-error (MMSE) method, between the equalization output $z(n)$ and delayed variant of the received signal, $x(n-u)$, where u is known as a reference timing. The path searcher 106 provides such a reference timing required by the equalizer 108 during operation.

The despreader 110 then despreads the output of the equalizer 108 using the spreading codes allocated to the mobile station. The signal detector 112 then recovers from the output of the despreader 110 data symbols intended for the mobile station.

In a conventional equalization receiver, the FIR filter length G is chosen to be greater than or equal to the subchannel length L, so that energy from all taps in the respective subchannel may be captured. The number of taps therefore is typically chosen to be equal to the subchannel length L. Taps are sampled outputs corresponding to different time delays from a continuous signal measured against units of time delays sampled at a sampling frequency, for example at chip rate sampling frequency, where the continuous signal represents the channel response of the wireless channel between the base station and mobile station. Only a single equalizer is required when G is chosen in this way, and the minimum total number of equalizer coefficients required for the operation of the equalizer in the conventional equalization receiver is ML, which is deemed very large for a wireless communications system.

Typically in a conventional equalization receiver with a large number of taps, noise is increased and convergence problems arise when the equalizer is implemented using adaptive algorithms. The least mean square (LMS) algorithm, a type of adaptive algorithm, is not suitable for the acquisition of equalizer coefficients because of the typically long convergence time relating to such an algorithm. Conversely, adaptive algorithms which involve a short convergence time, such as the recursive least square (RLS) algorithm, are considered too complex for applications with a large number of taps. If the adaptive algorithm diverges, or converges slowly, it is difficult to achieve the suppression of IFI and MAI, which is an important objective of an equalization receiver.

There is therefore clearly a need for CDMA downlink receivers that suppress IFI and MAI, employ a simple receiver structure, and apply a fast convergence algorithm for addressing the foregoing problems.

Specification Text:

In accordance with a first aspect of the invention, there is described hereinafter a code division multiple access downlink receiver for providing wireless communication via a wireless channel between a base station and a mobile station in which the receiver is implemented. The receiver comprises a plurality of subchannels whereof each conveys at least one signal received from the base station, and a cell searcher for receiving signals in the plurality of subchannels and retrieving therefrom a common code relating to a cell. The receiver also comprises a code generator for generating a set of common and dedicated codes relating to at least one communication channel using the output of the cell searcher, and a plurality of equalizers for receiving the code generator output and equalizing the received signals in the plurality of subchannels, wherein each of the plurality of equalizers includes a plurality of filters wherein each of the plurality of filters corresponds to each of the plurality of subchannels.

In accordance with a second aspect of the invention, there is described hereinafter in a code division multiple access downlink receiver, a method for providing wireless communication via a wireless channel between a base station and a mobile station in which the receiver is implemented. The method comprises the steps of providing a plurality of subchannels whereof each conveys at least one signal received from the base station, and receiving using a cell searcher signals in the plurality of subchannels and retrieving therefrom a common code relating to a cell. The method also comprises the steps of generating using a code generator a set of common and dedicated codes relating to at least one communication channel using the output of the cell searcher, and using a plurality of equalizers for receiving the code generator output and equalizing the received signals in the plurality of subchannels, wherein each of the plurality of equalizers includes a plurality of filters wherein each of the plurality of filters corresponds to each of the plurality of subchannels.

BRIEF DESCRIPTION OF THE DRAWINGS

Embodiments of the invention are described hereinafter with reference to the drawings, in which.

DETAILED DESCRIPTION

Figure 1:
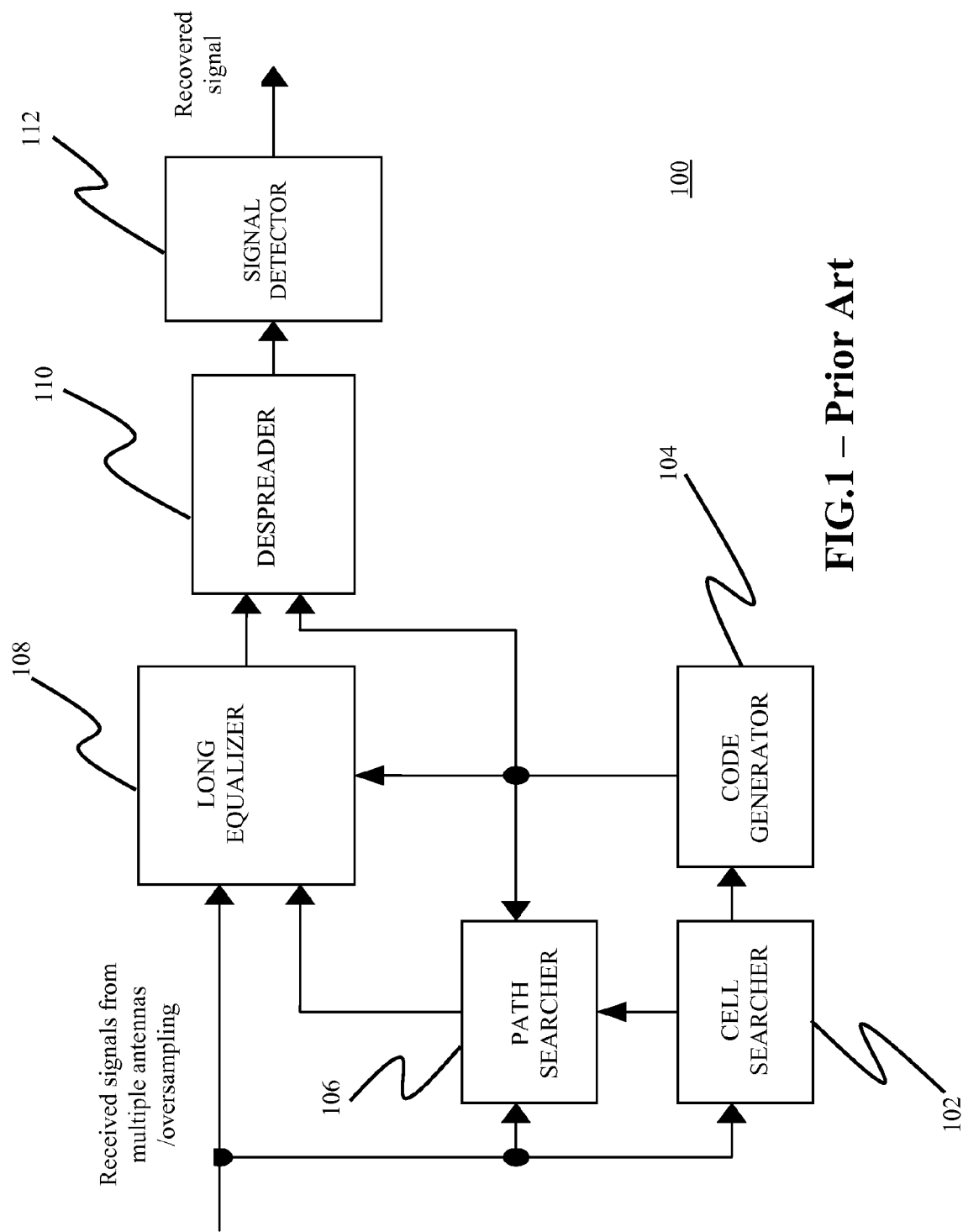
FIG. 1 is a block diagram of a conventional equalization receiver.

CDMA downlink receivers that suppress IFI and MAI, employ a simple receiver structure, and apply a fast convergence algorithm for addressing the foregoing problems are described hereinafter according to embodiment of the invention.

In any CDMA downlink transmission systems, $T_s$ and $T_c$ are denoted as the symbol interval and chip interval, respectively. The processing gain PG=$T_s/T_c$, and there are PG sets of orthogonal short channelization codes. If N mobile stations share the same cell or sector, then there are (N+2) channels including N dedicated channels DTCHs and two common channels CPICH and CCPCH, each of which shares the same long scrambling code but is allocated a unique short channelization code.

Let $s_{cp}(k)$ and $s_{cc}(k)$ be modulated symbol-level data symbols, or data symbols embedded in CPICH and CCPCH, respectively. These data symbols convey the information to be shared by all mobile stations within the same cell or sector. The data symbols $s_{cp}(k)$ and $s_{cc}(k)$ are respectively spread by the spreading codes $c_{cp}(n)$ and $c_{cc}(n)$ corresponding to CPICH and CCPCH, respectively, generating chip-level spread signals $x_{cp}(n)$ and $x_{cc}(n)$ the values of which are, for n=0, 1, . . . , as follows:

$x_{cp}(k_1G+n_1)=\tilde{x}_{cp}(k_1;n_1)$, $\tilde{x}_{cp}(k_1;n_1)=s_{cp}(k_1)c_{cp}(n_1)$,
  $k_1=0, 1, \ldots,$ and $n_1=0, \ldots, G-1$.

$x_{cc}(k_1G+n_1)=\tilde{x}_{cc}(k_1;n_1)$, $\tilde{x}_{cc}(k_1;n_1)=s_{cc}(k_1)c_{cc}(n_1)$,
  $k_1=0, 1, \ldots,$ and $n_1=0, \ldots, G-1$.

Let $s_l(k)$ (l=0, 1, . . . N−1) be the modulated symbol-level data symbols embedded in an lth DTCH. These data symbols convey the information to be transmitted to the lth mobile station. The data symbols $s_l(k)$ are spread by spreading code $c_l(n)$ corresponding to the lth DTCH, generating a chip-level spread signal $x_l(n)$, the value of which are, for n=0, 1, . . . , as follows:

$x_l(k_1G+n_1)=\tilde{x}_l(k_1;n_1)$, $\tilde{x}_l(k_1; n_1)=s_l(k_1)c_l(n_1)$, $k_1=0, 1, \ldots,$ and $n_1=0, \ldots, G-1$.

The spread signals for CPICH, CCPCH and DTCHs are then summed up for generating the transmitted signal x(n), which is given by:

$$x(n) = \sum_{l=0}^{N-1} x_l(n) + x_{cp}(n) + x_{cc}(n) \quad (1)$$

There may be many tall obstacles such as buildings and hills situated between base stations and a mobile station, and a wireless channel is therefore well modeled as a wide-sense stationary uncorrelated scattering (WSSUS) channel. In a CDMA downlink transmission system, a transmitted signal arrives at a mobile station together with several time-delayed, amplitude-scaled variants of the transmitted signal which travel along multiple paths in the wireless channel. An equalization receiver in the mobile station resolves the multipath wireless channel into several paths which convey these multipath signals known as rays, the time delays of which are multiples of a spread signal chip interval $T_c$, and each ray is subject to statistically independent Rayleigh fading. The resolved ray with time delay τ represents a group of multipath signals with time delays over an interval [τ−$T_c$/2, τ+$T_c$/2].

In the equalization receiver, the impulse response for the kth subchannel may be represented in the complex form as:

$$\tilde{h}_k(t;\tau) = \sum_{m=0}^{B-1} \tilde{\alpha}_{k,m}(t)\delta(\tau - \tau_{k,m}) \quad (2)$$

where $\tilde{\alpha}_{k,m}(t)$ and $\tau^{k,m}$ are the path gain and time delay, respectively, of the mth path corresponding to the kth subchannel with $$\sum_{m=0}^{B-1} E[|\tilde{\alpha}_{k,m}(t)|^2] = 1$$

in which δ(x) is the delta function, and B is the number of resolved rays.

The time delay $\tau_{k,m}$ changes relatively slow, while the path gain $\tau_{k,m}$ changes much faster depending on changes in the wireless communications environment, including movement of the mobile station. Further, since the subchannels are obtained through oversampling or multiple receiver antennas the separation of which is much smaller than the distance between the base station and the mobile station, all subchannels tend to have same set of time delay parameters.

If the channel responses of the subchannels are constant over an observation period, for example one time slot, then the discrete chip-level wireless channel response is:

$h_k(n)=\tilde{h}_k(n/T_c)$ for n=0, 1, . . . , L−1, where L is the subchannel length represented by the maximum integer smaller than $\tau_B/T_c$ in which $\tau_B$ is the time difference between the first and last resolved rays arriving at the mobile station. A noiseless received signal at the equalization receiver is expressed as the convolution of the transmitted signal with the discrete wireless channel responses. Thus the received signal at the kth subchannel is:

$$y_k(n) = \sum_{l=0}^{L-1} h_k(l)x(n-l) + w_k(n) \quad (3)$$

where $w_k(n)$ is the additive white Gaussian noise (AWGN) received at the kth subchannel.

Figure 2:
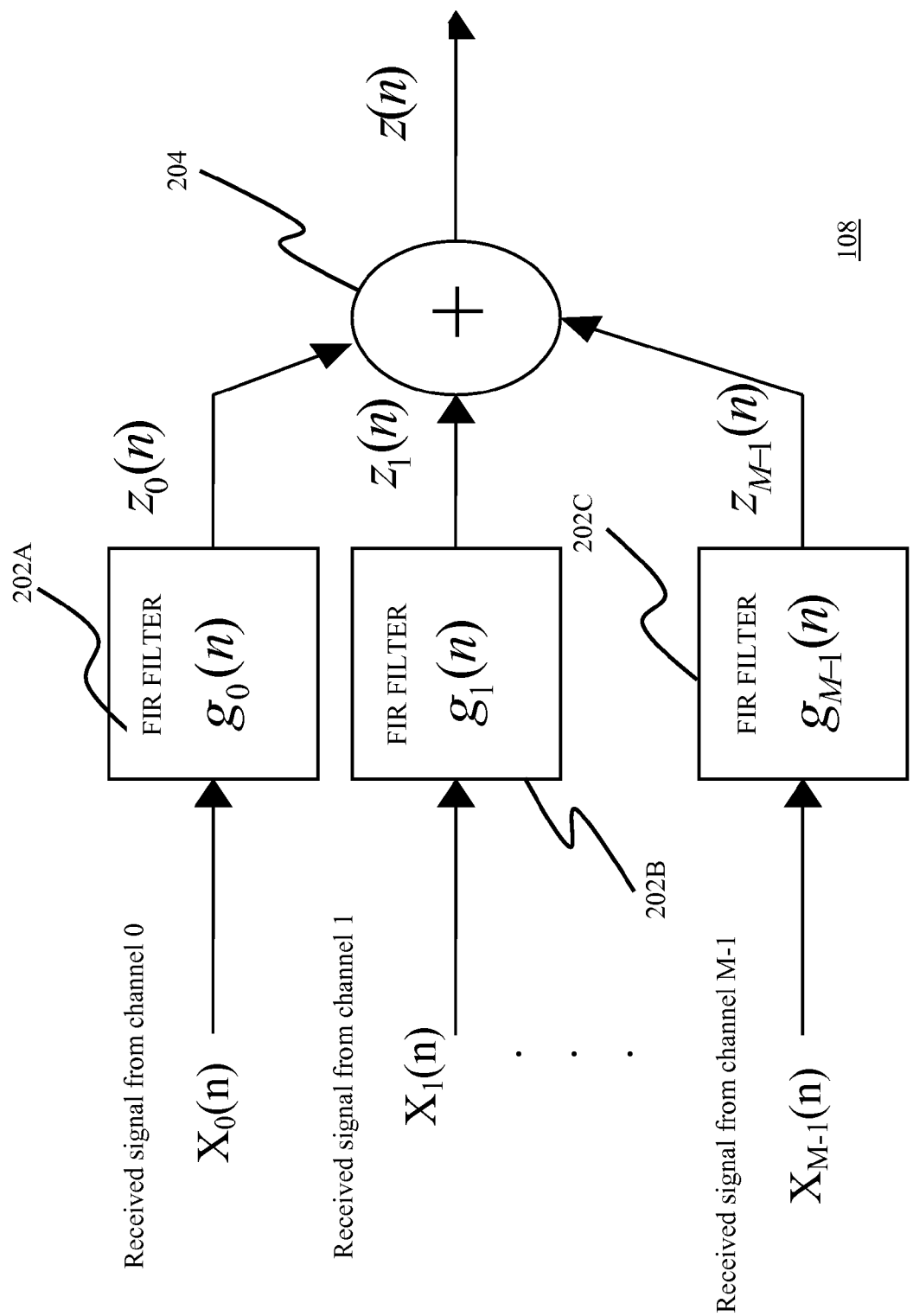
FIG. 2 is a block diagram of processing units in an equalizer module in the conventional equalization receiver of FIG. 1.

With reference to an equalizer shown in FIG. 2, $g_k(l)$, l=0, 1, . . . , G−1, denote FIR filter coefficients for the equalizer corresponding to the kth subchannel, and G denotes the filter length for each subchannel. The filtering output corresponding to kth subchannel is given by:

$$z_k(n) = \sum_{l=0}^{G-1} g_k^*(l) y_k(n-l) \quad (4)$$

and the overall equalization output is:

$$z(n) = \sum_{k=0}^{M-1} z_k(n) = \sum_{k=0}^{M-1} \sum_{l=0}^{G-1} g_k^*(l) y_k(n-l) \quad (5)$$

There are two important issues regarding the equalization receivers, namely how to obtain the equalizer coefficients and how to select the filter length G.

The equalizer coefficients $g_k(l)$ may be obtained, for example, by minimizing the difference, using the minimum mean-square-error (MMSE) method, between the overall equalization output, z(n), and delayed version of the transmitted signal, x(n−u), where u is called the reference timing or lag of the reference signal x(n).

To obtain the MMSE-based equalizer coefficients, different criteria may be used for different CDMA downlink transmission conditions, such as the Min-max method, pilot channel equalization method, and any other filtering method known to those skilled in the art.

The Mini-Max technique is based on the principle that, with perfect zero-forcing (ZF) equalization, despreading using the spreading code of the mobile station recovers the data symbols intended for the mobile station, while the result of despreading using any unused spreading codes in the same cell or sector is null. Therefore, this technique minimizes the total power of despread outputs based on the unused spreading codes, and maximizes the power of the despread output based on the spreading code of the mobile station.

Alternatively, an adaptive symbol equalizer that applies the pilot channel equalization method has been proposed, which applies the minimum mean-square-error (MMSE) criterion and uses the data symbols in the common channel CPICH as a reference signal. The adaptive symbol equalizer updates equalizer coefficients by minimizing the difference between the equalization outputs and the data symbols in the CPICH according to the MMSE method, and equalizes the spread signal intended for the DTCH using the same coefficients.

In order to achieve perfect ZF equalization, it is required that the total number of unknown coefficients is greater than or equal to the number of taps of the equalized subchannel, i.e., $$MG \geq L+G-1 \quad (6)$$

or $$G \geq (L-1)/(M-1) \quad (7)$$

In the conventional equalization receiver, the FIR filter length $G \geq L$ is chosen so that perfect ZF equalization is achieved and the energy from all taps of the subchannels may be captured simultaneously. By selecting G this way, the overall channel response relating to L taps is equalized, and thus the minimum equalizer length is ML. For a wireless channel, the maximum access delay may be as high as 50 μs, which corresponds to L=192 for a CDMA downlink transmission system with a chip rate of 3.84 Mcps. If the number of physical channels is M=4, then designing an FIR equalizer with a minimum equalizer length ML=768 taps is considered to involve a complex receiver structure. Also, any equalization receiver with such large number of taps inherits noise increase and convergence problems when implemented with adaptive algorithms.

The LMS algorithm is not suitable for the acquisition of equalizer coefficients because of the typically long convergence time relating to such an algorithm. Conversely, adaptive algorithms which involve a short convergence time, such as the RLS algorithm, are considered too complex for applications with a large number of taps. Since only a single conventional equalizer is used, path diversity is not achieved. Moreover, the performance of the conventional equalization receiver depends on the timing (lag), u, of the reference signal selected from the period between the first and last arriving rays.

It is proposed herein that perfect ZF equalization may be achieved as long as equation (7) is satisfied. It is also proposed that with a shorter FIR filter length, the equalization receiver structure becomes simpler, and to some extent, the adaptive algorithms therein converge faster. In equalization receivers according to embodiments of the invention, the smallest G is chosen while satisfying the conditions of equation (7). If G is chosen to be less than L, only part of the energy from all taps of the channel may be captured. Therefore in order to capture the energy from all taps relating to the wireless channel, the equalization receivers according to embodiments of the invention include multiple lag-dependent equalizers, or short equalizers known hereinafter, and a combiner for subsequent processing. Each short equalizer has different timing of reference signal, and works independently from each other. The combiner then captures the powers from each equalizer's outputs, thus providing the diversity gain.

Figure 3:
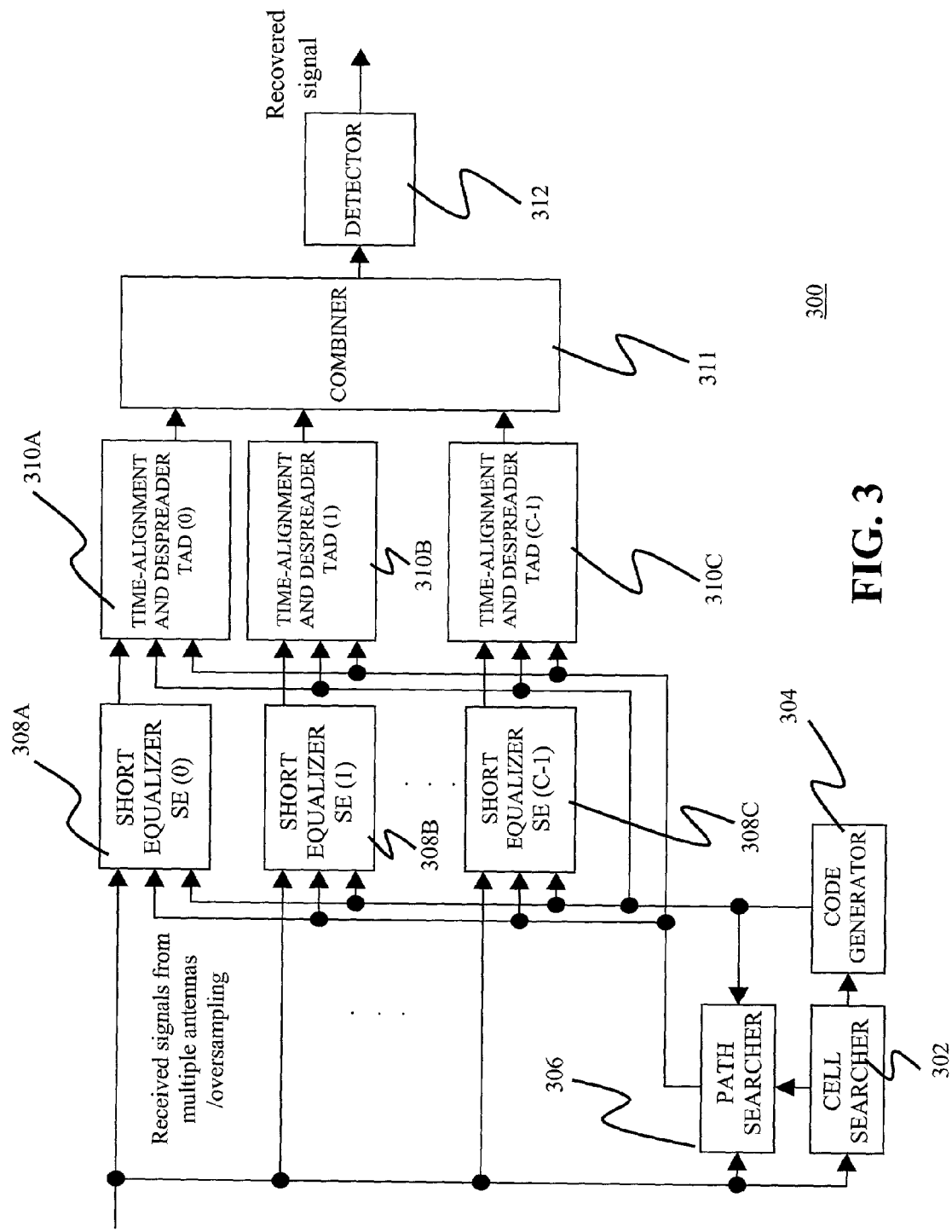
FIG. 3 is a block diagram of an equalization receiver having multiple short equalizers, a symbol-level combiner, and a path searcher according to a first embodiment of the invention.

FIG. 3 is a block diagram of an equalization receiver 300 in a mobile station according to a first embodiment of the invention. The equalization receiver 300 includes a cell searcher 302, a code generator 304, a path searcher 306, C multiple short equalizers (SEs) 308, C multiple time-alignment and despreader modules (TADs) 310, a symbol-level combiner 311, and a signal detector 312. The cell searcher 302, path searcher 306, and C multiple SEs 308 are connected to and receive input from multiple antennas that may employ oversampling. The cell searcher 302 processes the input, and is connected and provides inputs to the code generator 304 and path searcher 306. The code generator 304 processes the input, and in turn is connected and provides input to the path searcher 306, C multiple SEs 308, and C multiple TADs 310. The path generator 306 processes all inputs, and is connected and provides input to the C multiple SEs 308 and C multiple TADs 310. With all inputs, the C multiple SEs 308 perform processing, and are connected and provide inputs to the corresponding C multiple TADs 310, which then use all inputs for processing, and are connected and provide inputs to the combiner 311. The combiner 311 processes all inputs from the C multiple TADs 310, and is connected and provides input to the signal detector 312.

In the equalization receiver 300, the cell searcher 302 receives from a CDMA downlink transmission system a transmitted signal and the corresponding rays using the multiple antennas that may employ oversampling, and retrieves therefrom long scrambling codes relating to a cell or sector in which the equalization receiver 300 operates, and information relating to cell and frame synchronization. In particular, parameters relating to frame synchronization, for example, the time delay for the first resolved ray, $\tau_0$, are retrieved. The code generator 304 using the long scrambling codes retrieved by the cell searcher 302, generates a combination of long scrambling codes and short channelization codes known as spreading codes relating to the common channels CPICH and CCPCH and the corresponding dedicated channel DTCH required by the SEs 308 and TADs 310. The path searcher 306 then using the data symbols of the common channel CPICH and the long scrambling and short channelization codes, the time delay $\tau_0$ for the first resolved ray, and the received signals, provides the time delay parameters $\tau_0, \ldots, \tau_{B-1}$, of the resolved rays with largest received powers.

The SEs 308, SE(0) 308A, SE(1) 308B, ..., SE(C-1) 308C, are implemented using the same equalizer structure as the conventional equalizer shown in FIG. 2, or the like equalization architectures, but with a shorter FIR filter length $\tilde{G}$. Also, each SE 308 is provided with a unique reference timing, which is determined by the time delay parameters of the resolved rays.

In the kth SE 308, SE(k), there are M linear FIR filters $g_{kj}(n)$, $j=0, \ldots, M-1$, each of which corresponds to each of the M physical channels with a response $h_j(n)$. During operation, the received signals relating to a physical channel j passes into a corresponding FIR filter of length $\tilde{G}$ thereby producing a filtering output. A combiner in the SE(k) 308 then sums the outputs from each FIR filter thereby generating a signal for further processing by a corresponding TAD(k) 310. The equalizer coefficients may be obtained, for example, by minimizing the difference, using the minimum mean-square-error (MMSE) method, between the overall equalization output of the SE(k) 308 and delayed version of the transmitted signal, $x(n-u_k)$, where the reference timing $u_k$ is chosen as the time delay of the kth resolved ray $\lfloor \tau_k/T_c \rfloor$. This means that the equalizer coefficients may be obtained by minimizing the following cost function:

$$J_k = \left| \sum_{j=0}^{M-1} \sum_{l=0}^{\tilde{G}-1} g_{kj}^*(l) y_k(n-l) - x(n-u_k) \right|^2 = |g_k^H y(n) - x(n-u_k)|^2$$

which yields:

$g_k = R^{-1} r_k$ where $R = E[y(n)y^H(n)]$ and $r_k = E[y(n)x^*(n-u_k)]$.

If the direct matrix inversion (DMI) method is used coefficients for each SE 308, the calculation is very simple because all SEs 308 share the same matrix R, thus only a single matrix inversion operation is required.

Further, when an adaptive symbol algorithm such as the LMS or RLS algorithm is used to update the equalizer coefficients, the convergence property of such an adaptive symbol algorithm depends on the matrix R. It is preferred that the adaptive symbol algorithms for all SEs 308 have the same convergence properties.

The number of SEs 308 implemented is usually determined by the design of the equalization receiver 300. If the number of resolved rays is greater than the number of SEs 308, only the time delays of the C largest or strongest resolved rays are used to determine reference timings for the SEs 308. Otherwise, B SEs 308, B being the number of resolved rays, are used to capture the B resolved rays.

The TADs 310, TAD(0) 310A, TAD(1) 310B, ..., TAD(C-1) 310C, then align the outputs from all corresponding SEs 308 based on the same reference timings used in the SEs 308, and despread the time-aligned outputs of the SEs 308 using the spreading codes allocated to the mobile station. The combiner 311 combines the despread outputs from all TADs 310, and the signal detector 312 then recovers from the output of the combiner 312 data symbols intended for the mobile station.

In FIG. 3, the reference timings used in the SEs 308 are determined by the time delay information acquired by the path searcher 306. The corresponding reference timing, however, may also be fixed or predetermined, in which case the path searcher 308 is not required in the equalization receiver 300.

Figure 4:
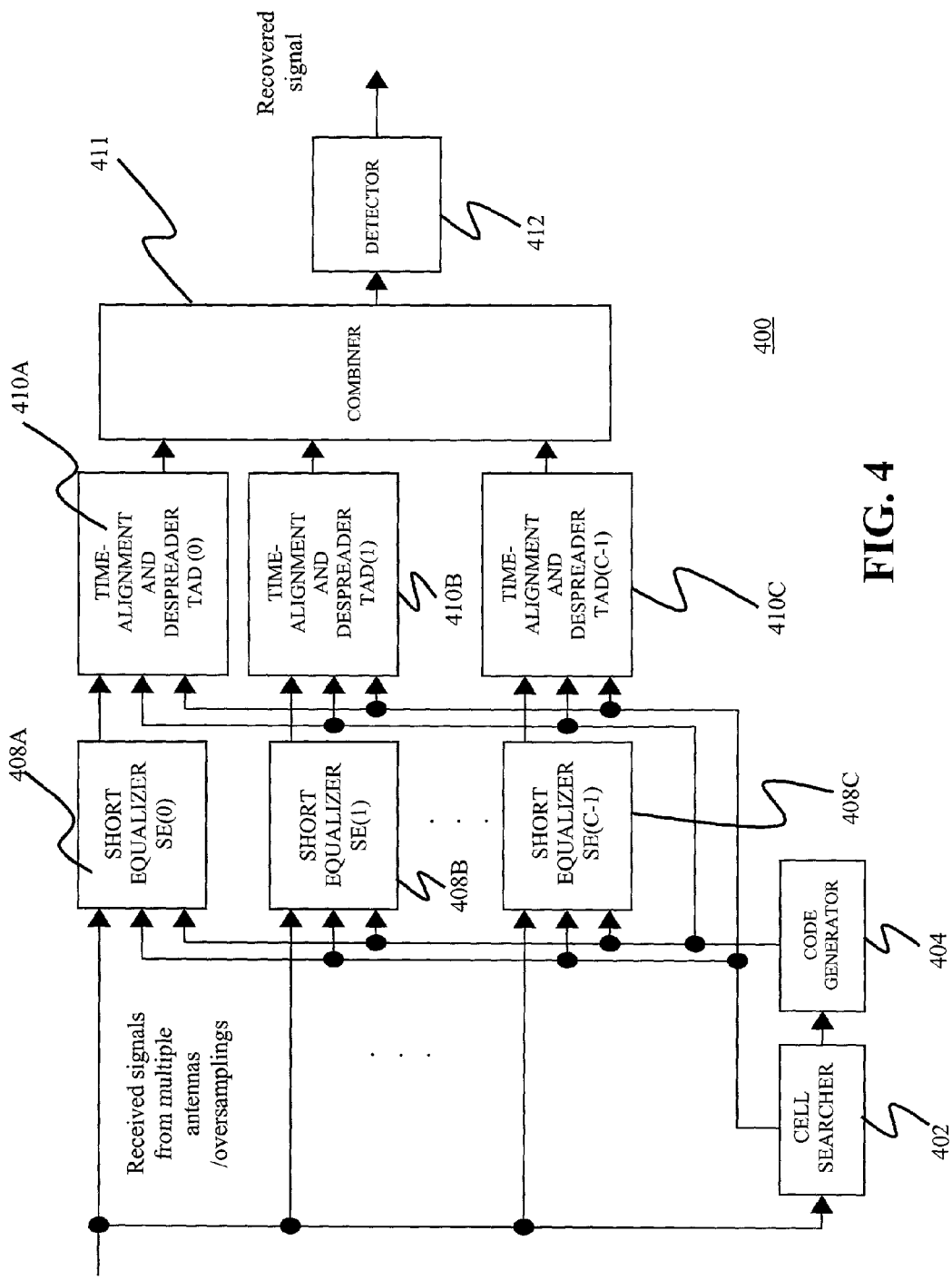
FIG. 4 is a block diagram of an equalization receiver having multiple short equalizers and a symbol-level combiner, without a path searcher, according to a second embodiment of the invention.

FIG. 4 is a block diagram of such an equalization receiver 400 in a mobile station according to a second embodiment of the invention. The equalization receiver 400 includes a cell searcher 402, a code generator 404, C multiple SEs 408, C multiple TADs 410, a symbol-level combiner 411, and a signal detector 412. The cell searcher 402 and C multiple SEs 408 are connected to and receive input from multiple antennas that may employ oversampling. The cell searcher 402 processes the input, and is connected and provides inputs to the code generator 404, C multiple SEs 408 and C multiple TADs 410. The code generator 404 processes the input, and in turn is connected and provides input to the C multiple SEs 408 and C multiple TADs 410. With all inputs, the C multiple SEs 408 perform processing, and are connected and provide inputs to the corresponding C multiple TADs 410, which then use all inputs for processing and are connected and provide inputs to the combiner 411. The combiner 411 processes all inputs from the C multiple TADs 410, and is connected and provides input to the signal detector 412.

In the equalization receiver 400, the cell searcher 402 receives from a CDMA downlink transmission system a transmitted signal and the corresponding rays using the multiple antennas that may employ oversampling, and retrieves therefrom long scrambling codes relating to a cell or sector in which the equalization receiver 400 operates, and information relating to cell and frame synchronization. In particular, parameters relating to frame synchronization, for example, the time delay for the first resolved ray, $\tau_0$, are retrieved. The code generator 404 using the long scrambling codes retrieved by the cell searcher 402, generates a combination of long scrambling codes and short channelization codes known as spreading codes relating to the common channels CPICH and CCPCH and the corresponding dedicated channel DTCH required by the SEs 408 and TADs 410.

The SEs 408, SE(0) 408A, SE(1) 408B, ..., SE(C-1) 408C, are implemented using the same equalizer structure as the conventional equalizer shown in FIG. 2, or the like equalization architectures, but with a shorter FIR filter length $\tilde{G}$. Also, each SE 408 is provided with a unique reference timing, which is delayed by a fixed or predetermined value.

In the kth SE 408, SE(k), there are M linear FIR filters $g_{kj}(n)$, $j=0, \ldots, M-1$, each of which corresponds to each of the M physical channels with a response $h_j(n)$. During operation, the received signals relating to a physical channel; passes into a corresponding FIR filter of length $\tilde{G}$ thereby producing a filtering output. A combiner in the SE(k) 408 then sums the outputs from each FIR filter thereby generating a signal for further processing by a corresponding TAD(k) 410. The equalizer coefficients may be obtained, for example, by minimizing the difference, using the minimum mean-square-error (MMSE) method, between the overall equalization output of the SE(k) 408 and delayed version of the transmitted signal, x(n−$u_k$), where the reference timing $u_k$ is fixed or predetermined as $\lfloor \tau_0/T_c \rfloor + k\tilde{G}$.

The TADs 410, TAD(0) 410A, TAD(1) 410B, ..., TAD(C−1) 410C, then align the outputs from all corresponding SEs 408 based on the same reference timings used in the SEs 408, and despread the time-aligned outputs of the SEs 408 using the spreading codes allocated to the mobile station. The combiner 411 combines the despread outputs from all TADs 410, and the signal detector 412 then recovers from the output of the combiner 412 data symbols intended for the mobile station.

If power delay profiles are known, an intelligent cluster analysis may be used in the equalization receiver 400 to determine the FIR filter length, $\tilde{G}$, and the reference timings, $\tau_k$, required by the SEs 408.

Figure 5:
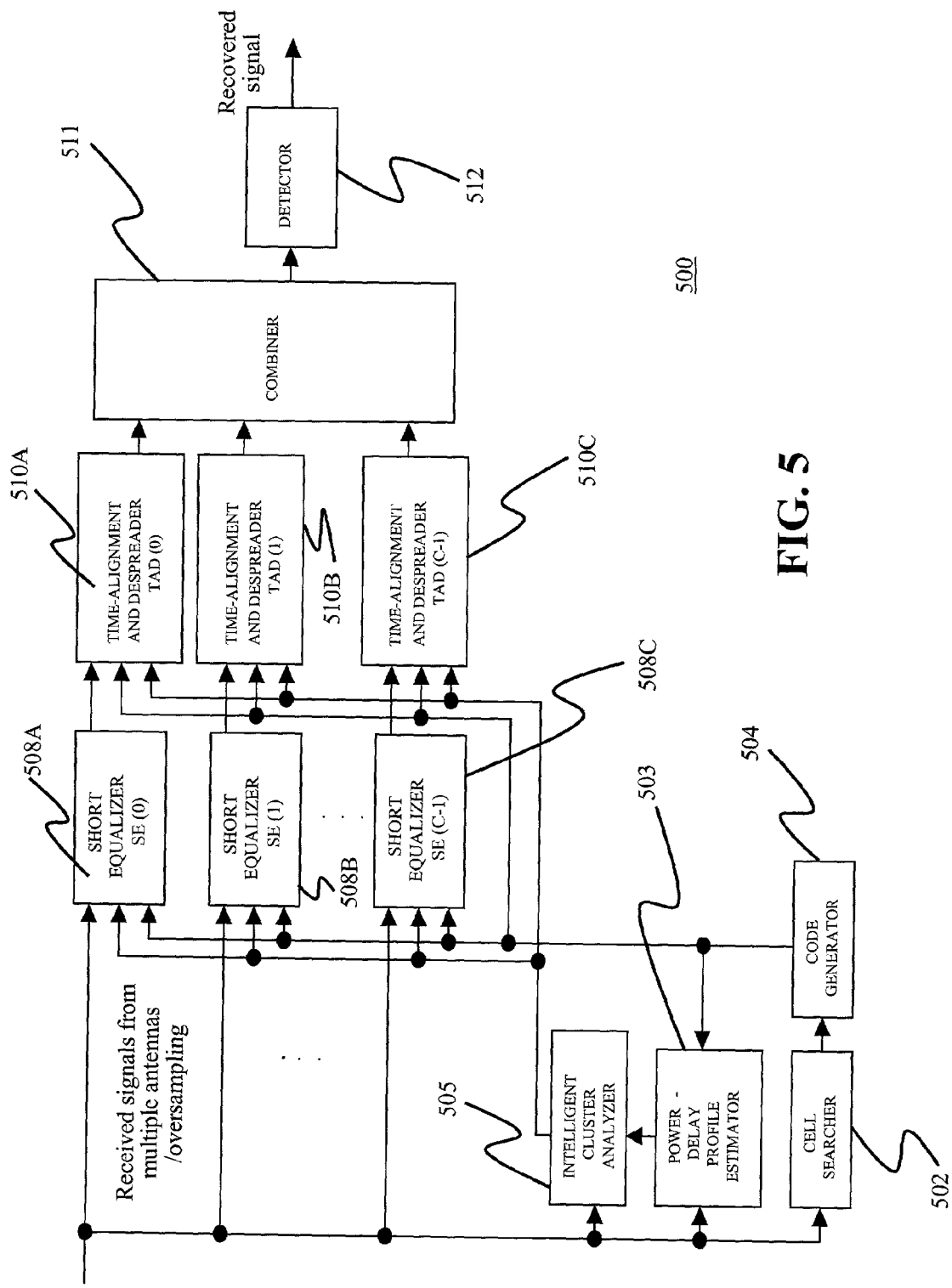
FIG. 5 is a block diagram of an equalization receiver having multiple short equalizers, a symbol-level combiner, and an intelligent cluster analyzer according to a third embodiment of the invention.

FIG. 5 is a block diagram of such an equalization receiver 500 in a mobile station according to a third embodiment of the invention. The equalization receiver 500 includes a cell searcher 502, a code generator 504, a power delay profile estimator 503, an intelligent cluster analyzer 505, C multiple SEs 508, C multiple TADs 510, a symbol-level combiner 511, and a signal detector 512. The cell searcher 502, power delay profile estimator 503, intelligent cluster analyzer 505, and C multiple SEs 508 are connected to and receive input from multiple antennas that may employ oversampling. The cell searcher 502 processes the input, and is connected and provides input to the code generator 504. The code generator 504 processes the input, and in turn is connected and provides input to the power delay profile estimator 503, C multiple SEs 508, and C multiple TADs 510. The power delay profile estimator 503 processes all inputs, and is connected and provides input to the intelligent cluster analyzer 505, which in turn process all inputs, and is connected and provides input to the C multiple SEs 508 and C multiple TADs 510. With all inputs, the C multiple SEs 508 perform processing, and are connected and provide inputs to the corresponding C multiple TADs 510, which then use all inputs for processing, and are connected and provide inputs to the combiner 511. The combiner 511 processes all inputs from the C multiple TADs 510, and is connected and provides input to the signal detector 512.

In the equalization receiver 500, the cell searcher 502 receives from a CDMA downlink transmission system a transmitted signal and the corresponding rays using the multiple antennas that may employ oversampling, and retrieves therefrom long scrambling codes relating to a cell or sector in which the equalization receiver 500 operates, and information relating to cell and frame synchronization. In particular, parameters relating to frame synchronization, for example, the time delay for the first resolved ray, $\tau_0$, are retrieved. The code generator 504 using the long scrambling codes retrieved by the cell searcher 502, generates a combination of long scrambling codes and short channelization codes known as spreading codes relating to the common channels CPICH and CCPCH and the corresponding dedicated channel DTCH required by the SEs 508 and TADs 510. The power delay profile estimator 503 then using the data symbols of the CPICH and the long scrambling and short channelization codes and the received signals, provides an estimate of the power delay profile of the wireless channel from which the mobile station retrieves the received signals. The intelligent cluster analyzer 505 receives the power delay profile estimate, and generates the information regarding the number of SEs 508, and the filter length and the reference timings relating to the SEs 508.

The SEs 508, SE(0) 508A, SE(1) 508B, ..., SE(C−1) 508C, are implemented using the same equalizer structure as the conventional equalizer shown in FIG. 2, or the like equalization architectures, but with a shorter FIR filter length $\tilde{G}$. Also, each SE 308 is provided with a unique reference timing, which is determined by the intelligent cluster analyzer 505.

In the kth SE 508, SE(k), there are M linear FIR filters $g_{kj}(n)$, j=0, ..., M−1, each of which corresponds to each of the M physical channels with a response $h_j(n)$. During operation, the received signals relating to a physical channel j passes into a corresponding FIR filter of length $\tilde{G}$ thereby producing a filtering output. A combiner in the SE(k) 508 then sums the outputs from each FIR filter thereby generating a signal for further processing by a corresponding TAD(k) 510. The equalizer coefficients may be obtained, for example, by minimizing the difference, using the minimum mean-square-error (MMSE) method, between the overall equalization output of the SE(k) 508 and delayed version of the transmitted signal, x(n−$u_k$), where the reference timing $u_k$ is determined by the intelligent cluster analyzer 505.

The TADs 510, TAD(0) 510A, TAD(1) 510B, ..., TAD(C−1) 510C, then align the outputs from all corresponding SEs 508 based on the same reference timings used in the SEs 508, and despread the time-aligned outputs of the SEs 508 using the spreading codes allocated to the mobile station. The combiner 511 combines the despread outputs from all TADs 510, and the signal detector 512 then recovers from the output of the combiner 512 data symbols intended for the mobile station.

The intelligent cluster analyzer 505 is described in greater detail hereinafter, with reference to FIGS. 10 to 12, which respectively illustrate the power-delay profiles for hilly terrain (HT), typical urban (TU), and equalization test (EQ) models in accordance with GSM proposals. From the power-delay profiles shown in FIGS. 10 to 12, the channel length, L, in terms of chip intervals, is small for the TU model, but large for the HT and EQ models.

Figure 10:
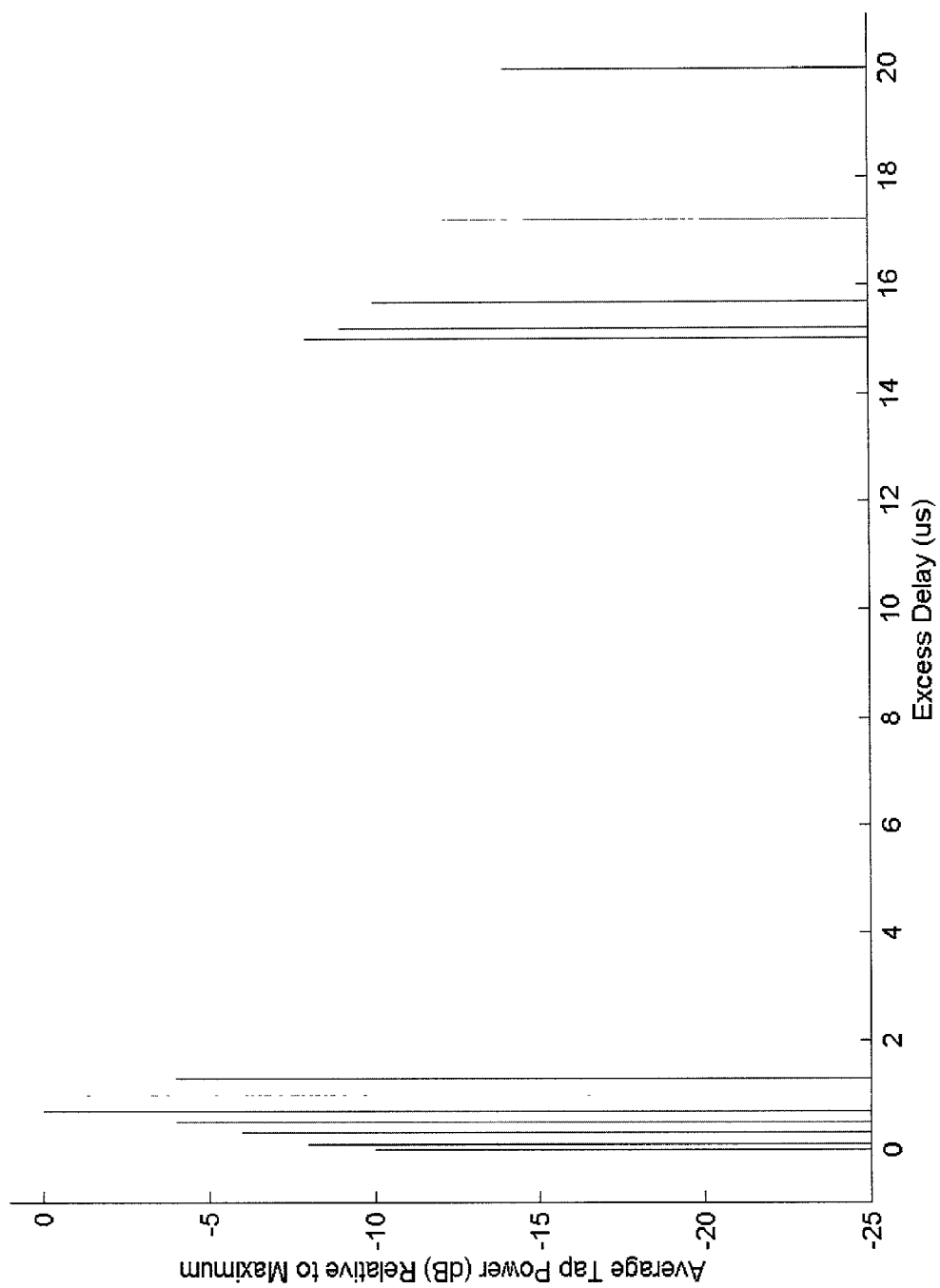
FIG. 10 illustrates the power-delay profile for a hilly terrain (HT) model in accordance with the Global Special Mobile (GSM) proposals.
Figure 12:
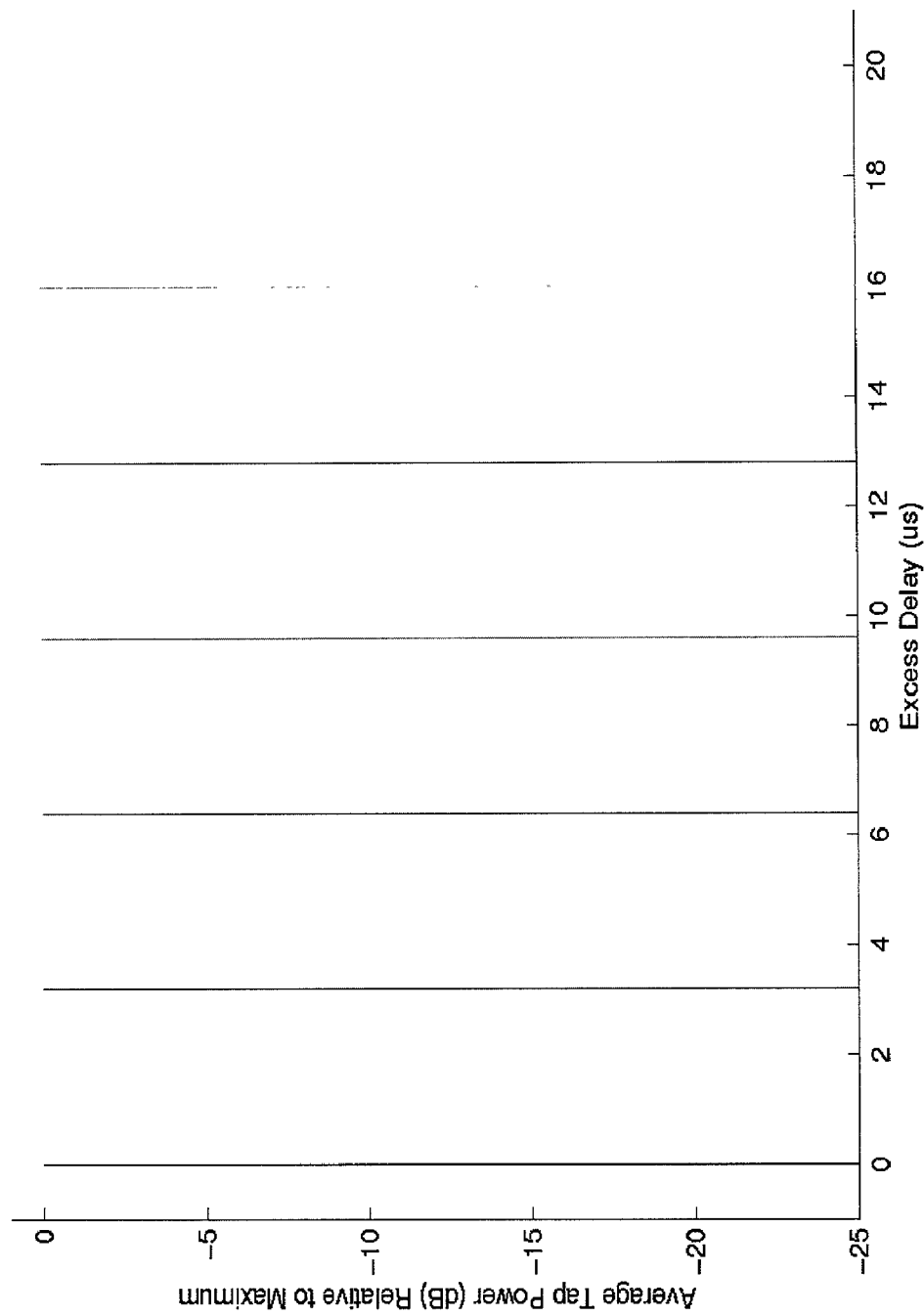
FIG. 12 illustrates the power-delay profile for an equalization test (EQ) model in accordance with the GSM proposals.

Even though the maximum access delay may be as large as 20 μs for the HT power-delay profile model and 16 μs for the EQ power-delay profile model as shown in FIGS. 10 and 12, respectively, the number of dominant rays is usually small. There is typically a large number of taps of which the corresponding equalizer coefficients are zero. Therefore, the overall channel may be classified into several ray clusters, and the time domain channel response, h(n), may be written as:

$$h(n) = \sum_{k=1}^{P} \sum_{l=0}^{Q-1} \alpha_{k,l} \delta(n - n_k - l) \tag{8}$$

where

P is the number of ray clusters;

Q is the maximum channel length for the ray clusters;

$n^k$ is the number of chip intervals by which the kth ray cluster is delayed;

$\alpha_{k,l}$ is the channel coefficient for the lth path of the kth ray cluster;

$\delta(x)$ is a delta function, whose value is one for x=0, and zero for others.

Equivalently, the frequency domain channel response may be expressed as:

$$H(\omega) = \sum_{k=1}^{P} H_k(\omega) z^{-j\omega n_k T_c} \qquad (9)$$

where $H_k(\omega)$ is the frequency domain channel response of the kth cluster ray; and $T_c$ is the chip interval or duration.

With classification of ray clusters, the equalization receiver 500 does not equalize the overall channel response H(z). Instead, by making use of multiple antennas or oversampling, each ray cluster is equalized separately by the cancellation of the other ray clusters. It is assumed that all wireless channels have similar power delay profile in terms of the ray cluster positions in time, even though the average power for different rays may be different. This is true for oversampled wireless channels, and also for multiple antennas since the antenna spacing at the mobile station is too small compared with the distance between the base station and the mobile station.

If the equalizer length for each channel is $\tilde{G}$, then the total number of unknown equalizer coefficients is $M\tilde{G}$. To obtain ZF equalization for the desired ray cluster and cancellation of the other cluster rays, the number of linear equations is $P(Q+\tilde{G}-1)$. Therefore, a condition that is be satisfied in order to achieve perfect ZF and cancellation is:

$$M\tilde{G} \geq P(Q+\tilde{G}-1) \qquad (10)$$

A number of observations are made when satisfying condition (10) to achieve perfect ZF equalization and cancellation of the other cluster rays. Firstly, if Q=1, the number of physical channels M cannot be less than the number of ray clusters P. If Q>1, M is also greater than P.

Secondly, for a given number of physical channels M>P, the equalizer length for each physical channel should satisfy the condition $$\tilde{G} \geq \frac{P(Q-1)}{M-P},$$

in which the total equalizer length $$M\tilde{G} \geq \frac{MP(Q-1)}{M-P}.$$

For M=P+1, the minimum total length of the equalizer is P(P+1)(Q-1). By increasing M, the required total equalizer length $M\tilde{G}$ decreases, with the minimum being P(Q-1).

Figure 11:
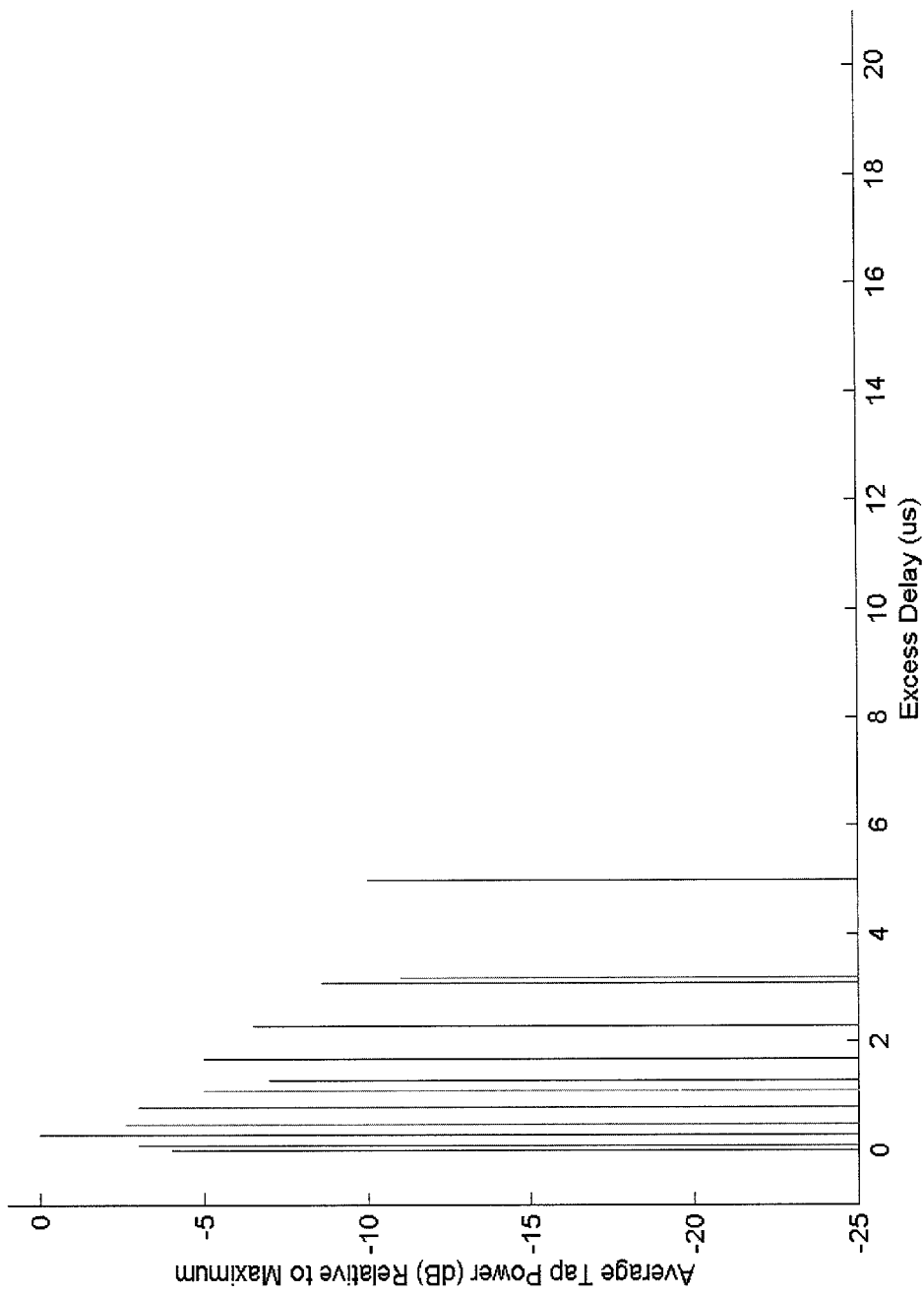
FIG. 11 illustrates the power-delay profile for a typical urban (TU) model in accordance with the GSM proposals.

With reference to the EQ, TU and HT power-delay profile models shown in FIGS. 10 to 12, a detailed description is provided for the method by which the intelligent cluster analyzer 505 generates information regarding the number of SEs 508, and the filter length and the reference timings of the SEs 508.

In relation to the HT power-delay profile model shown in FIG. 10, the maximum access delay is 20 µs, which corresponds to 77 chip intervals for chip rate 3.84 Mcps. If there are four physical channels (M=4), then the total equalizer length is 308 taps for a conventional equalization receiver. In the equalization receiver 500, the total equalizer length is relatively shorter and is dependent on multiple ray clusters into which the wireless channel is divided in a number of ways.

Firstly, the wireless channel may be divided into two ray clusters which include all rays in the power-delay profile. The first 1.3 µs of the power-delay profile is classified a first ray cluster, while the last 5 µs a second ray cluster, thereby providing the maximum access delay of 5 µs. Thus P=2 and Q=20, Q being the maximum length of the second ray cluster and is the maximum integer of 5 µs×3.84 Mcps. In this case, the minimum equalizer length for each ray cluster is $\tilde{G}$=19, and the total equalizer length is $M\tilde{G}$=96.

Alternatively, the wireless channel may be divided into two ray clusters which include all rays except the last in the power-delay profile. The first 1.3 µs of the power-delay profile is classified a first ray cluster, while the last 5 µs a second ray cluster with the last ray being omitted. Therefore the maximum access delay relates to the second ray cluster and is 2 µs. Thus P=2 and Q=8, Q being the maximum length of the second ray cluster and is the maximum integer of 2 µs×3.84 Mcps. In this case, the minimum equalizer length for each ray cluster is $\tilde{G}$=7, and the total equalizer length is $M\tilde{G}$=28.

A further alternative is to divide the wireless channel into two ray clusters which include all rays except the last two in the power-delay profile. The first 1.3 µs of the power-delay profile is classified a first ray cluster, while the last 5 µs is classified a second ray cluster with the last two rays being omitted. Therefore the maximum excess delay relates to the first ray cluster and is 1.3 µs. Thus P=2, and Q=5, Q being the maximum length of the first ray cluster and is the maximum integer of 1.3 µs×3.84 Mcps. In this case, the minimum equalizer length for each ray cluster is $\tilde{G}$=4, and the total equalizer length is $M\tilde{G}$=16.

In the foregoing manner of dividing the wireless channel into multiple ray clusters, the number of SEs 508 and the reference timings relating to the SEs 508 are respectively dependent on the number (P) of ray clusters and the time delays corresponding to those ray clusters. For example, in relation to the first way of dividing the wireless channel into multiple ray clusters, the number of SEs 508 is two and the corresponding reference timings are 1.3 µs and 5 µs.

In relation to the TU power-delay profile model shown in FIG. 11, the maximum access delay is 5 µs, which corresponds to 20 chips for chip rate 3.84 Mcps. In order to perform equalization, a conventional equalization receiver is required to employ 20 taps in the equalizer for each channel. If four channels are used, then the total equalizer length is 80.

In the equalization receiver 500 in which intelligent cluster analysis is applied, the overall wireless channel is considered as a single ray cluster (P=1, Q=20), and four channels are used (M=4). According to conditions set in equation (10), the minimum equalizer length for each channel is $\tilde{G}$=7 and the total equalizer length is 28. By changing the timing of the reference signal, multiple SEs 508 may be designed, the outputs of which are then despread and combined to yield better SNR performance. In the equalization receiver 500, the number of SEs 508 and the reference timing for each SE 508 may be varied according to the hardware and software complexity the equalization receiver 500 may support.

Even though multiple SEs 508 are used in the equalization receiver 500, each SE 508 has a much shorter equalizer length then the conventional equalizer, and works independently from the other SEs 508. Therefore, it is expected that each SE 508 and the equalization receiver 500 involve faster convergence and lower divergence probability than the conventional equalizer receiver.

In relation to the EQ power-delay profile model shown in FIG. 12, there are six equally time-delayed rays and the maximum access delay is 16 μs. The overall wireless channel is divided into six ray clusters in time domain, in which each ray cluster contains only one resolved ray (P=6), each ray has only one ray (Q=1). If six channels (M=6) are available, then according to equation (3), perfect ZF equalization and cancellation of other ray clusters may be achieved for each ray cluster. In the recovery of the first ray and cancellation of the other rays, six linear equations may be formed, from which the six unknown coefficients may be estimated. After each ray has been extracted, the outputs from each ray may be combined, with which path diversity is achieved. Therefore, the number of SEs 508 C=6, the filter length $\tilde{G}=1$, and the reference timing, $u_k=\tau_k$, k=0, . . . , 5.

In the equalization receivers shown in FIGS. 3 to 5, the outputs from the SEs are first despread, then combined at the symbol level. Alternatively, the outputs from the SEs may be combined at the chip level, then despread using one despreader.

Figure 6:
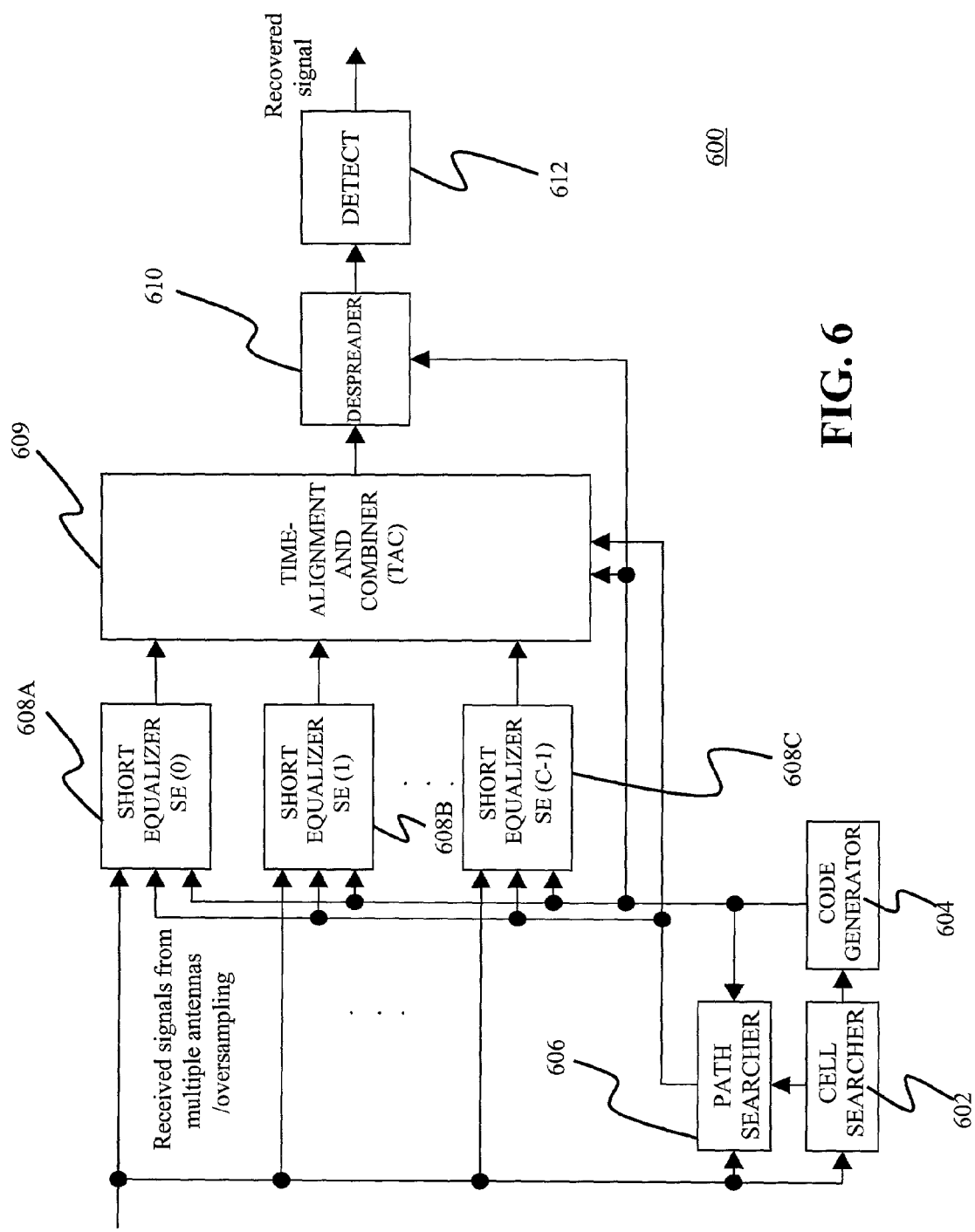
FIG. 6 is a block diagram of an equalization receiver having multiple short equalizers, a chip-level combiner, and a path searcher according to a fourth embodiment of the invention.

FIG. 6 is a block diagram of such an equalization receiver 600 according to a fourth embodiment of the invention. The equalization receiver 600 includes a cell searcher 602, a code generator 604, a path searcher 606, C multiple SEs 608, a time-alignment and combiner (TAC) 609, a despreader 610, and a signal detector 612. The cell searcher 602, path searcher 606, and C multiple SEs 608 are connected to and receive input from multiple antennas that may employ oversampling. The cell searcher 602 processes the input, and is connected and provides inputs to the code generator 604 and path searcher 606. The code generator 604 processes the input, and in turn is connected and provides input to the path searcher 606, C multiple SEs 608, TAC 609 and despreader 610. The path generator 306 processes all inputs, and is connected and provides input to the C multiple SEs 308 and TAC 609. With all inputs, the C multiple SEs 308 perform processing, and are connected and provide inputs to the TAC 609, which then uses all inputs for processing, and is connected and provide inputs to the despreader 610. The despreader 610 processes the inputs from the TAC 609 and code generator 604, and is connected and provides input to the signal detector 612.

In the equalization receiver 600, the cell searcher 602 receives from a CDMA downlink transmission system a transmitted signal and the corresponding rays from multiple antennas that may employ oversampling, and retrieves therefrom long scrambling codes relating to a cell or sector in which the equalization receiver 600 operates, and information relating to cell and frame synchronization. In particular, parameters relating to frame synchronization, for example, the time delay for the first resolved ray, $\tau_0$, are retrieved. The code generator 604 using the long scrambling codes retrieved by the cell searcher 602, generates a combination of long scrambling codes and short channelization codes known as spreading codes relating to the common channels CPICH and CCPCH and the corresponding dedicated channel DTCH required by the SEs 608 and despreader 610. The path searcher 606 then using the data symbols of the CPICH and the long scrambling and short channelization codes and the received signals, provides the time delay parameters, $\tau_0, \ldots, \tau_{B-1}$, of the resolved rays with largest received powers.

The SEs 608, SE(0) 608A, SE(1) 608B, . . . , SE(C−1) 608C, are implemented using the same equalizer structure as the conventional equalizer shown in FIG. 2, or the like equalization architectures, but with a shorter FIR filter length $\tilde{G}$. Also, each SE 608 is provided with a unique reference timing, which is determined by the time delay parameters of the resolved rays.

In the kth SE 608, SE(k), there are M linear FIR filters $g_{kj}(n)$, j=0, . . . , M−1, each of which corresponds to each of the M physical channels with a response $h_j(n)$. During operation, the received signals relating to a physical channel passes into a corresponding FIR filter of length $\tilde{G}$ thereby producing a filtering output. A combiner in the SE(k) 608 then sums the outputs from each FIR filter thereby generating a signal for further processing by the TAC 609. The equalizer coefficients may be obtained, for example, by minimizing the difference, using the minimum mean-square-error (MMSE) method, between the overall equalization output of the SE(k) 608 and delayed version of the transmitted signal, $x(n-u_k)$, where the reference timing $u_k$ is chosen as the time delay of the kth resolved ray $\lfloor \tau_k/T_c \rfloor$.

The TAC 609 aligns the outputs from all SEs 608 based on the same reference timings used in the SEs 608 and combines the time-aligned outputs of the SEs 608. The despreader 610 then despreads the combined chip-level output of the TAC 609 using the spreading codes allocated to the mobile station, and the signal detector 612 then recovers from the output of the despreader 610 data symbols intended for the mobile station.

The reference timings of the SEs 608 may also be chosen as fixed values, in which case the path searcher 606 may not be required in the equalization receiver 600.

Figure 7:
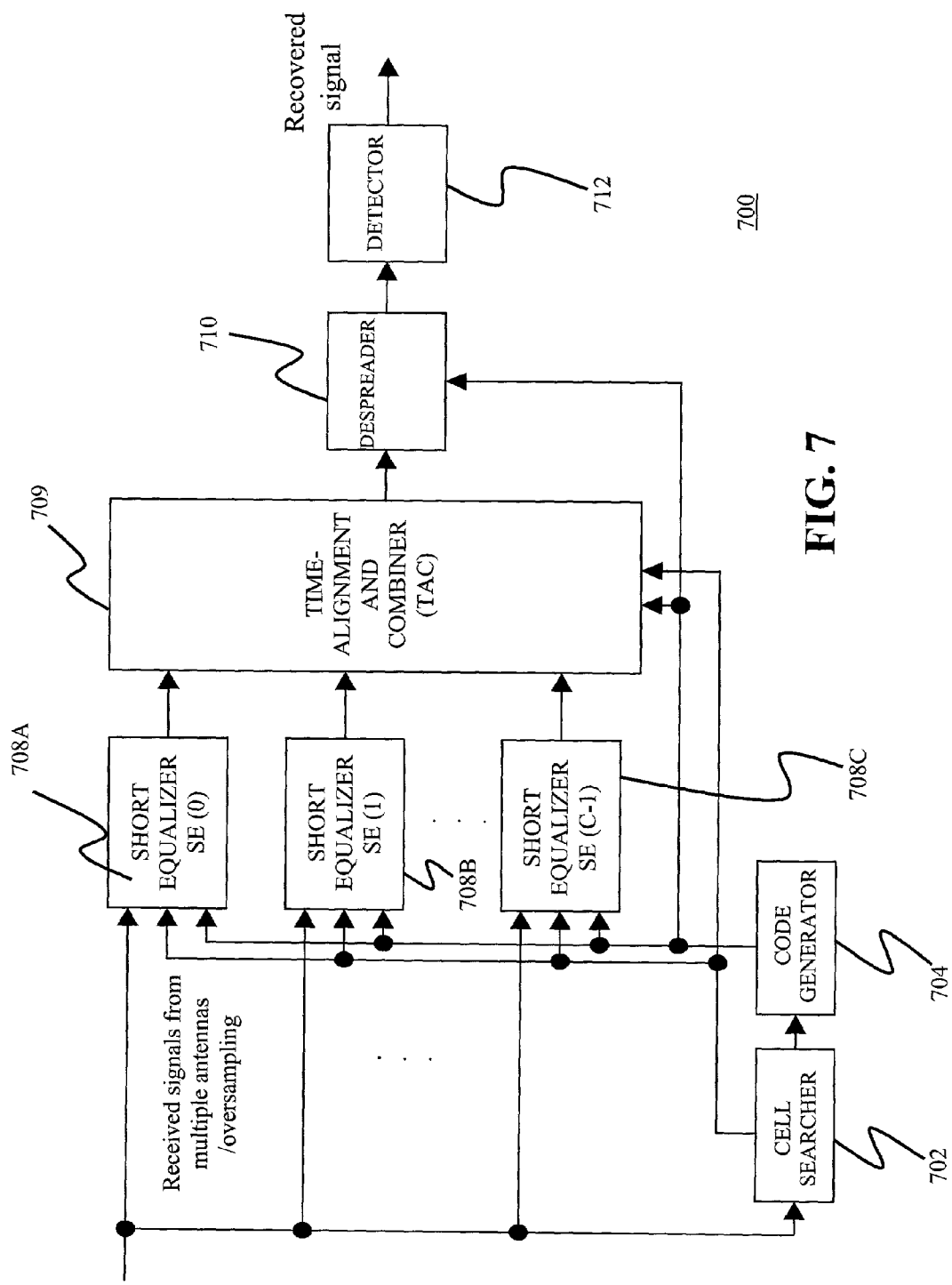
FIG. 7 is a block diagram of an equalization receiver having multiple short equalizers and a chip-level combiner, without a path searcher, according to a fifth embodiment of the invention.

FIG. 7 is a block diagram of such an equalization receiver 700 according to a fifth embodiment of the invention. The equalization receiver 700 includes a cell searcher 702, a code generator 704, C multiple SEs 708, a TAC 709, a despreader 710, and a signal detector 712. The cell searcher 702 and C multiple SEs 708 are connected to and receive input from multiple antennas that may employ oversampling. The cell searcher 702 processes the input, and is connected and provides inputs to the code generator 704, C multiple SEs 408 and TAC 709. The code generator 404 processes the input, and in turn is connected and provides input to the C multiple SEs 408, TAC 709, and despreader 710. With all inputs, the C multiple SEs 408 perform processing, and are connected and provide inputs to the TAC 709, which then uses all inputs for processing and is connected and provide inputs to the despreader 710. The despreader 710 processes all inputs from the TAC 709 and code generator 704, and is connected and provides input to the signal detector 712.

In the equalization receiver 700, the cell searcher 702 receives from a CDMA downlink transmission system a transmitted signal and the corresponding rays from multiple antennas that may employ oversampling, and retrieves therefrom long scrambling codes relating to a cell or sector in which the equalization receiver 700 operates, and information relating to cell and frame synchronization. In particular, parameters relating to frame synchronization, for example, the time delay for the first resolved ray, $\tau_0$, are retrieved. The code generator 704 using the long scrambling codes retrieved by the cell searcher, generates a combination of long scrambling codes and short channelization codes known as spreading codes relating to the common channels CPICH and CCPCH and the dedicated channel DTCH required by the equalizers and the despreaders.

The SEs 708, SE(0) 708A, SE(1) 708B, . . . , SE(C−1) 708C, are implemented using the same equalizer structure as the conventional equalizer shown in FIG. 2, or the like equalization architectures, but with a shorter FIR filter length $\tilde{G}$. Also, each SE 708 is provided with a unique reference timing, which is delayed by a fixed or predetermined value.

In the kth SE 708, SE(k), there are M linear FIR filters $g_{kj}(n)$, j=0, ..., M−1, each of which corresponds to each of the M physical channels with a response $h_j(n)$. During operation, the received signals relating to a physical channel j passes into a corresponding FIR filter of length $\tilde{G}$ thereby producing a filtering output. A combiner in the SE(k) 708 then sums the outputs from each FIR filter thereby generating a signal for further processing by the TAC 709. The equalizer coefficients may be obtained, for example, by minimizing the difference, using the minimum mean-square-error (MMSE) method, between the overall equalization output of the SE(k) 708 and delayed version of the transmitted signal, $x(n-u_k)$, where the reference timing $u_k$ is fixed, e.g., $\lfloor \tau_0/T_c \rfloor + k\tilde{G}$.

The TAC 709 aligns the outputs from all SEs 708 based on the same reference timings used in the SEs 708 and combines the time-aligned outputs of the SEs 708. The despreader 710 then despreads the combined chip-level output of the TAC 709 using the spreading codes allocated to the mobile station, and the signal detector 712 then recovers from the output of the despreader 710 data symbols intended for the mobile station.

If power delay profiles are known, intelligent cluster analysis may be used in the equalization receiver to determine the FIR filter length, $\tilde{G}$, and the reference timings, $\tau_k$'s, required by the SEs.

Figure 8:
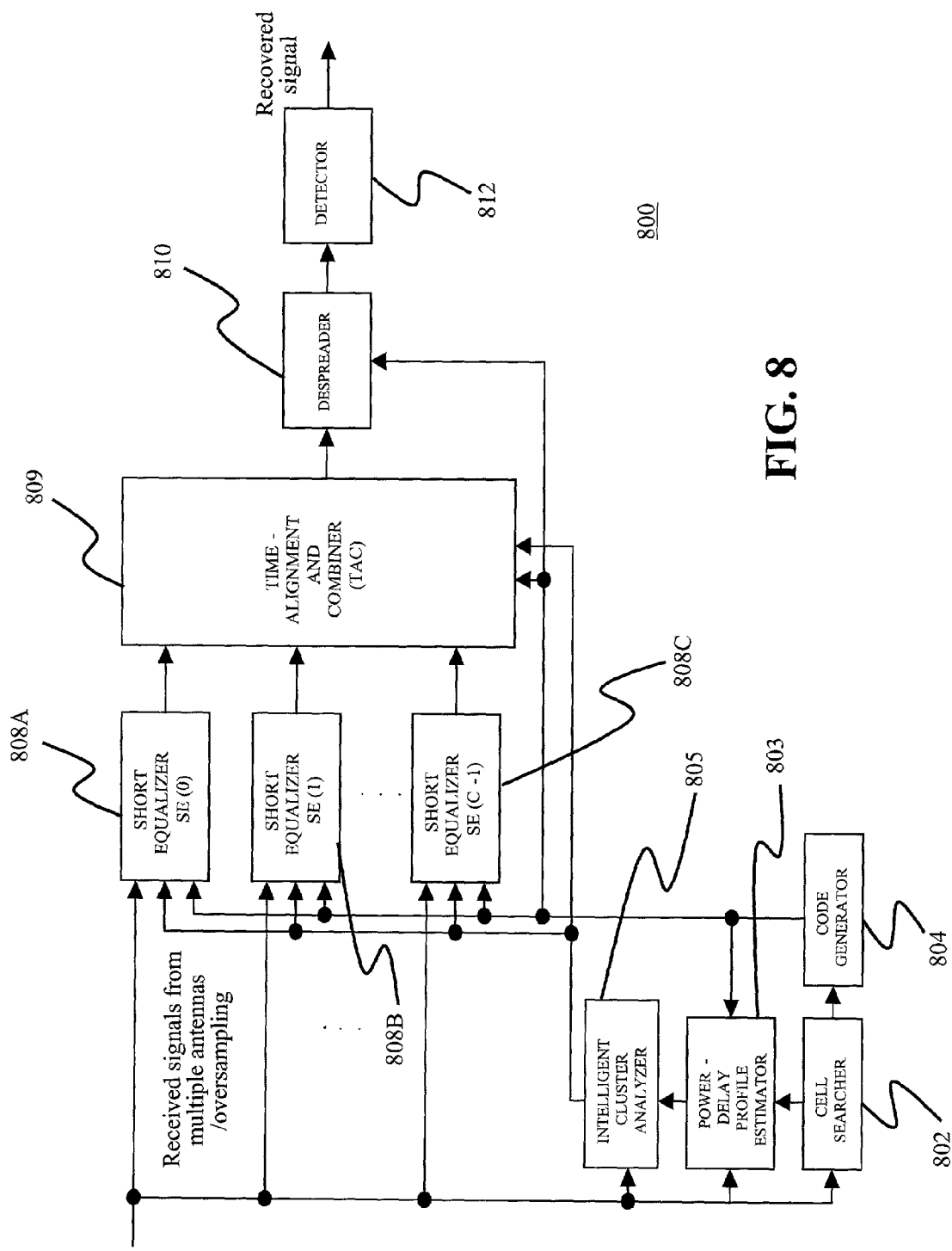
FIG. 8 is a block diagram of an equalization receiver having multiple short equalizers, a chip-level combiner, and an intelligent cluster analyzer according to a sixth embodiment of the invention.

FIG. 8 is a block diagram of such an equalization receiver 800 according to a sixth embodiment of the invention. The equalization receiver 800 includes a cell searcher 802, a code generator 804, a power delay profile estimator 803, an intelligent cluster analyzer 805, C multiple SEs 808, a TAC 809, a despreader 810 and a signal detector 812. The cell searcher 802, power delay profile estimator 803, intelligent cluster analyzer 805, and C multiple SEs 508 are connected to and receive input from multiple antennas that may employ oversampling. The cell searcher 802 processes the input, and is connected and provides input to the code generator 804. The code generator 804 processes the input, and in turn is connected and provides input to the power delay profile estimator 503, C multiple SEs 508, TAC 809, and despreader 710. The power delay profile estimator 803 processes all inputs, and is connected and provides input to the intelligent cluster analyzer 805, which in turn process all inputs, and is connected and provides input to the C multiple SEs 808 and TAD 809. With all inputs, the C multiple SEs 808 perform processing, and are connected and provide inputs to the TAC 809, which then uses all inputs for processing, and are connected and provide inputs to the despreader 810. The despreader 810 processes all inputs from the TAC 809, and is connected and provides input to the signal detector 812.

In the equalization receiver 800, the cell searcher receives from a CDMA downlink transmission system a transmitted signal and the corresponding rays using multiple antennas that may employ oversampling, and retrieves therefrom long scrambling codes relating to a cell or sector in which the equalization receiver 800 operates, and information relating to cell and frame synchronization. In particular, parameters relating to frame synchronization, for example, the time delay for the first resolved ray, $\tau_0$, are retrieved. The code generator 804 using the long scrambling codes retrieved by the cell searcher 802, generates a combination of long scrambling codes and short channelization codes known as spreading codes relating to the common channels CPICH and CCPCH required by the SEs 808 and despreader 810.

The power delay profile estimator 503 then using the data symbols of the CPICH and the long scrambling and short channelization codes and the received signals, provides an estimate of the power delay profile of the wireless channel from which the mobile station retrieves received signals. The intelligent cluster analyzer 805 receives the power delay profile estimate, and generates the information regarding the number of SEs 808, and the filter length and the reference timings of the SEs 808.

The SEs 708, SE(0) 708A, SE(1) 708B, ..., SE(C−1) 708C, are implemented using the same equalizer structure as the conventional equalizer shown in FIG. 2, or the like equalization architectures, but with a shorter FIR filter length $\tilde{G}$. Also, each SE 708 is provided with a unique reference timing. The FIR filter length and the reference timings are determined by the intelligent cluster analyzer 805.

In the kth SE 808, SE(k), there are M linear FIR filters $g_{kj}(n)$, j=0, ..., M−1, each of which corresponds to each of the M physical channels with a response $h_j(n)$. During operation, the received signals relating to a physical channel j passes into a corresponding FIR filter of length $\tilde{G}$ thereby producing a filtering output. A combiner in the SE(k) 808 then sums the outputs from each FIR filter thereby generating a signal for further processing by the TAC 809. The equalizer coefficients may be obtained, for example, by minimizing the difference, using the minimum mean-square-error (MMSE) method, between the overall equalization output of the SE(k) 808 and delayed version of the transmitted signal, $x(n-u_k)$, where the reference timing $u_k$ is determined by the intelligent cluster analyzer 805.

The TAC 809 aligns the outputs from all SEs 808 based on the same reference timings used in the SEs 808 and combines the time-aligned outputs of the SEs 808. The despreader 810 then despreads the combined chip-level output of the TAC 809 using the spreading codes allocated to the mobile station, and the signal detector 812 then recovers from the output of the despreader 810 data symbols intended for the mobile station.

Even though the foregoing equalization receivers are described in relation to CDMA downlink transmission systems, further embodiments of the invention may relate to CDMA uplink transmission systems by applying modifications known to those skilled in the art, and to other general broadband space-time equalization architectures.

Figure 9A:
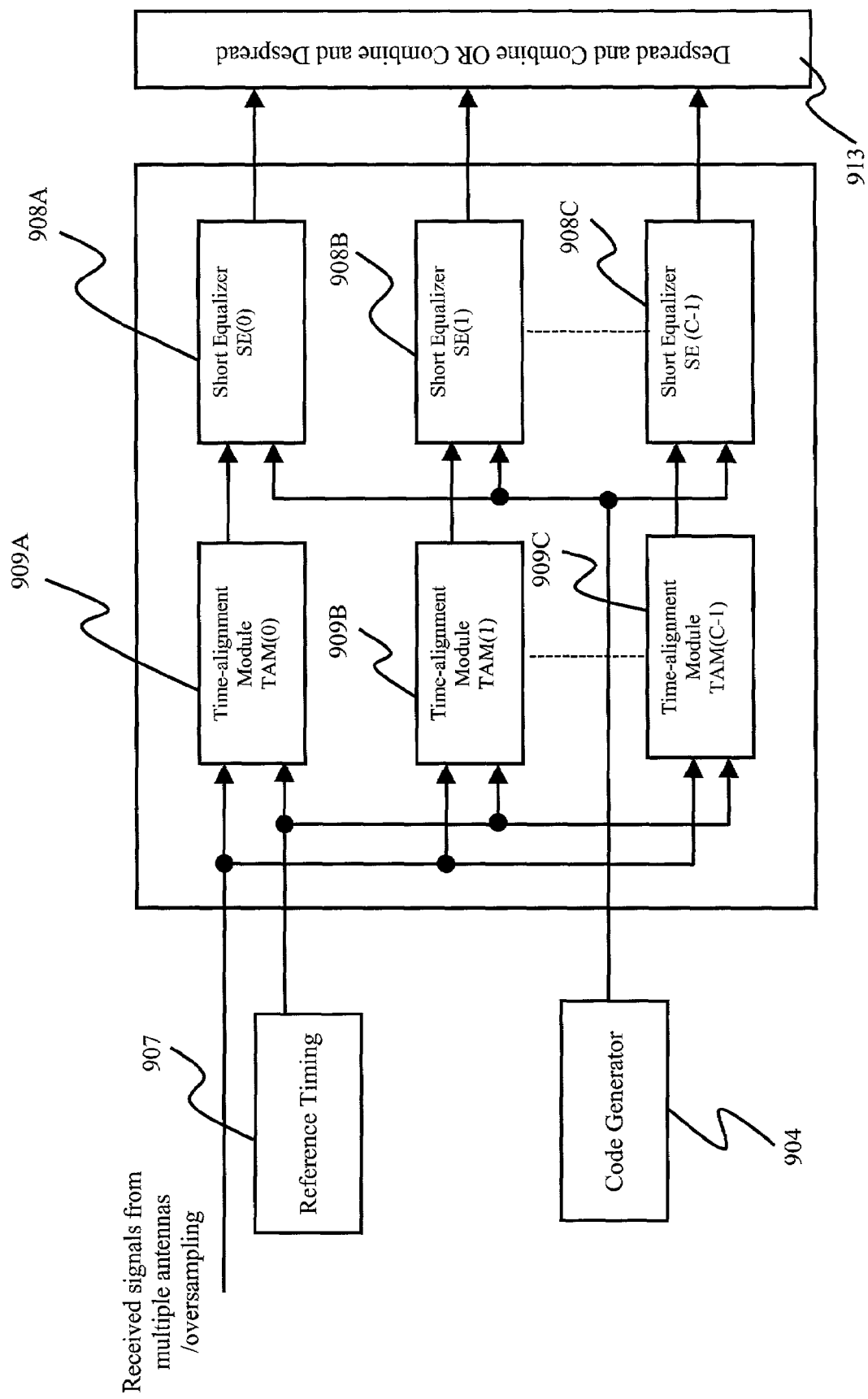
FIG. 9A is a block diagram of an equalizer receiver configuration having multiple short equalizers according to a seventh embodiment of the invention.
Figure 9B:
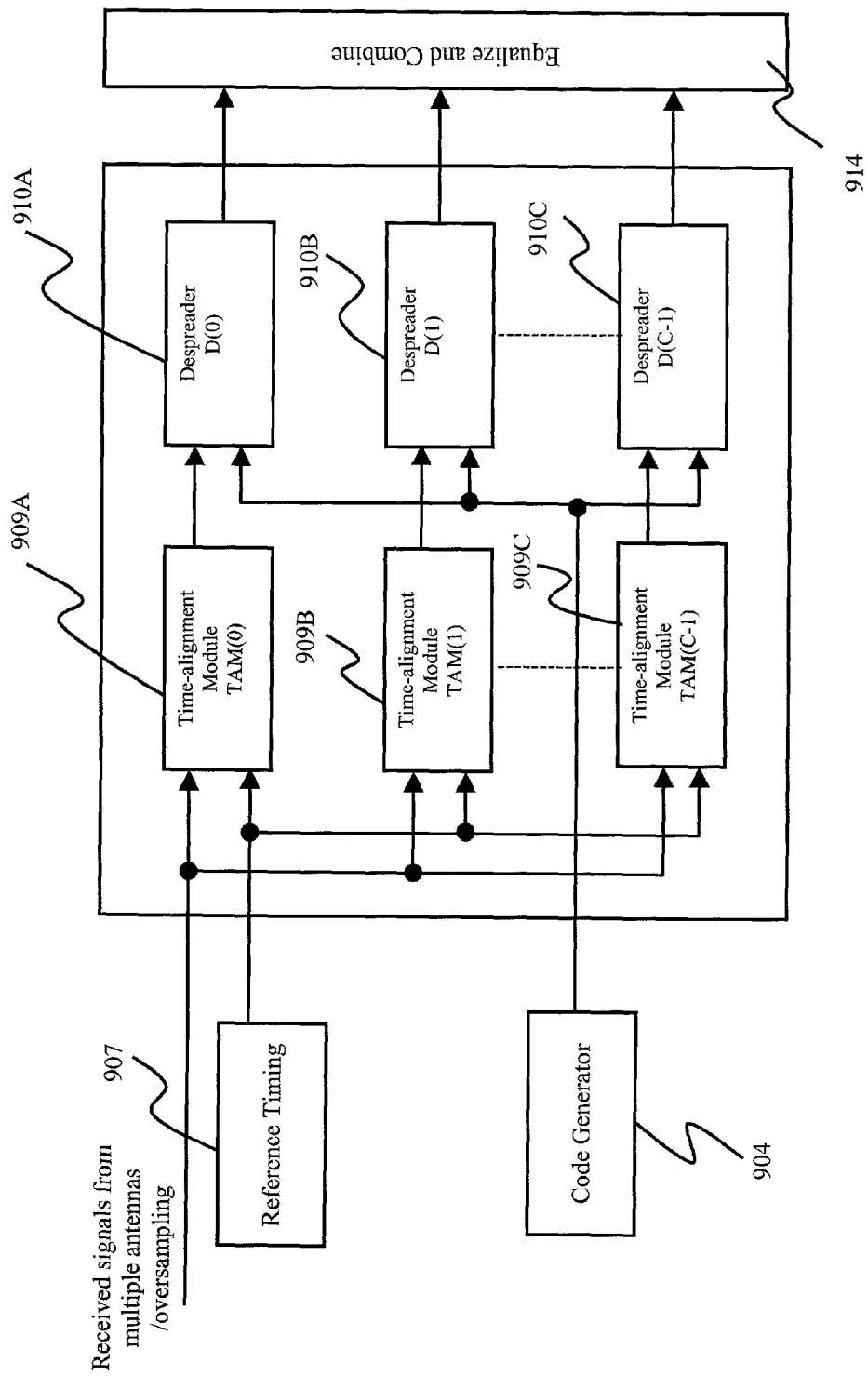
FIG. 9B is a block diagram of an equalizer receiver configuration having multiple short equalizers according to an eighth embodiment of the invention.

With reference to FIGS. 9A and 9B, further embodiments of the invention are described hereinafter. FIGS. 9A and 9B are block diagrams of equalizer receiver configurations having multiple short equalizers according to seventh and eighth embodiments of the invention, respectively.

FIG. 9A is a block diagram of the equalization receiver configuration 900A for implementation in an equalization receiver in a mobile station according to the seventh embodiment of the invention. The equalization receiver configuration 900A includes a code generator 904, a reference timing source 907, C multiple SEs 908, C multiple time-alignment modules (TAMs) 909, and a combiner/despreader or despreader/combiner module (CD/DC) 913. The C multiple TAMs 909 are connected to and receive input from multiple antennas that may employ oversampling. The code generator 904 is connected and provides input to the C multiple SEs 908, and may be connected to other modules in the equalization receiver as described with reference to FIGS. 3 to 8 for receiving inputs therefrom. The reference timing source 907 is connected and provides input to the C multiple TAMs 909. With all inputs, the C multiple TAMs 909 perform processing, and are connected and provide inputs to the corresponding C multiple SEs 908, which then use all inputs for processing and are connected and provide inputs to the CD/DC 913. The CD/DC 913 processes all inputs from the C multiple SEs 908, and may be connected other modules in the equalization receiver as described with reference to FIGS. 3 to 8 for receiving inputs therefrom or providing inputs thereto.

In the equalization receiver configuration 900A, the code generator 904 generates a combination of long scrambling codes and short channelization codes known as spreading codes relating to the common channels CPICH and CCPCH and the corresponding dedicated channel DTCH required by the C multiple SEs 908.

The TAMs 909, TAM(0) 909A, TAM(1) 909B, . . . , TAM(C−1) 909C, first align the received signals based on reference timings provided by the reference timing sources 907 to provide time-aligned signals. Each TAM 909 is provided with a unique reference timing by the reference timing source 907, which is determined by the time delay parameters of the resolved rays as described with reference to FIGS. 3 and 6, or which is delayed by a fixed or predetermined value as described with reference to FIGS. 4 and 7, or which is determined by an intelligent cluster analyzer as described with reference to FIGS. 5 and 8.

The SEs 908, SE(0) 908A, SE(1) 908B, . . . , SE(C−1) 908C, are implemented using the same equalizer structure as the conventional equalizer shown in FIG. 2, or the like equalization architectures, but with a shorter FIR filter length $\tilde{G}$, and are provided with the same reference timing.

In the kth SE 908, SE(k), there are M linear FIR filters $g_{kj}(n)$, j=0, . . . , M−1, each of which corresponds to each of the M physical channels with a response $h_j(n)$. During operation, the time-aligned signals relating to a physical channel j passes into a corresponding FIR filter of length $\tilde{G}$ thereby producing a filtering output. A combiner in the SE(k) 908 then sums the outputs from each FIR filter thereby generating a signal for further processing by the CD/DC 913. The equalizer coefficients may be obtained, for example, by minimizing the difference, using the minimum mean-square-error (MMSE) method, between the overall equalization output of the SE(k) 908 and delayed version of the transmitted signal. The delayed version of the transmitted signal may be represented by x(n−u), where u is called the reference timing or lag of the reference signal x(n) as described with reference to FIGS. 3 and 6, or x(n−$u_k$), where the reference timing $u_k$ is fixed or predetermined as $\lfloor \tau_0/T_c \rfloor + k\tilde{G}$ as described with reference to FIGS. 4 and 7, or x(n−$u_k$), where the reference timing $u_k$ is determined by the intelligent cluster analyzer as described with reference to FIGS. 5 and 8.

In the CD/DC 913, the time-aligned and equalized outputs of the SEs 908 are either first preferably despread using the spreading codes allocated to the mobile station using multiple despreaders and subsequently combined, or first combined and subsequently despread using a single despreader, the output of which may be used by a signal detector to then recover therefrom data symbols intended for the mobile station. The latter configuration, by nature of its simplicity, is a preferred way of processing in the CD/DC 913.

FIG. 9B is a block diagram of the equalization receiver configuration 900B for implementation in an equalization receiver in a mobile station according to the seventh embodiment of the invention. The equalization receiver configuration 900B includes a code generator 904, a reference timing source 907, C multiple TAMs 909, C multiple despreaders 910, and a multiple short equalizers and combiner module (MEC) 914. The C multiple TAMs 909 are connected to and receive input from multiple antennas that may employ oversampling. The code generator 904 is connected and provides input to the C multiple despreaders 910, and may be connected to other modules in the equalization receiver as described with reference to FIGS. 3 to 8 for receiving inputs therefrom. The reference timing source 907 is connected and provides input to the C multiple TAMs 909. With all inputs, the C multiple TAMs 909 perform processing, and are connected and provide inputs to the corresponding C multiple despreaders 908, which then use all inputs for processing and are connected and provide inputs to the MEC 914. The MEC 914 processes all inputs from the C multiple despreaders 910, and may be connected other modules in the equalization receiver as described with reference to FIGS. 3 to 8 for receiving inputs therefrom or providing inputs thereto.

In the equalization receiver configuration 900B, the code generator 904 generates a combination of long scrambling codes and short channelization codes known as spreading codes relating to the common channels CPICH and CCPCH and the corresponding dedicated channel DTCH required by the C multiple despreaders 910.

The TAMs 909, TAM(0) 909A, TAM(1) 909B, . . . , TAM(C−1) 909C, first align the received signals based on reference timings provided by the reference timing sources 907 to provide time-aligned signals. Each TAM 909 is provided with a unique reference timing by the reference timing source 907, which is determined by the time delay parameters of the resolved rays as described with reference to FIGS. 3 and 6, or which is delayed by a fixed or predetermined value as described with reference to FIGS. 4 and 7, or which is determined by an intelligent cluster analyzer as described with reference to FIGS. 5 and 8.

The C multiple despreaders 910 then using the spreading codes allocated to the mobile station despread the time-aligned signals.

In the MEC 914, the time-aligned and despread outputs of the C multiple despreaders 910 are first equalized and subsequently combined, the output of which may be used by a signal detector to then recover therefrom data symbols intended for the mobile station.

The multiple short equalizers in the MEC 914 are implemented using the same equalizer structure as the conventional equalizer shown in FIG. 2, or the like equalization architectures, but with a shorter FIR filter length $\tilde{G}$, and are provided with the same reference timings.

In the kth SE, SE(k), there are M linear FIR filters $g_{kj}(n)$, j=0, . . . , M−1, each of which corresponds to each of the M physical channels with a response $h_j(n)$. During operation, the time-aligned and despread signals relating to a physical channel j passes into a corresponding FIR filter of length $\tilde{G}$ thereby producing a filtering output. A combiner in the SE(k) 908 then sums the outputs from each FIR filter thereby generating a signal for further processing by the CD/DC 913. The equalizer coefficients may be obtained, for example, by minimizing the difference, using the minimum mean-square-error (MMSE) method, between the overall equalization output of the SE(k) and delayed version of the transmitted signal. The delayed version of the transmitted signal may be represented by x(n−u), where u is called the reference timing or lag of the reference signal x(n) as described with reference to FIGS. 3 and 6, or x(n−$u_k$), where the reference timing $u_k$ is fixed or predetermined as $\lfloor \tau_0/T_c \rfloor + k\tilde{G}$ as described with reference to FIGS. 4 and 7, or x(n−$u_k$), where the reference timing $u_k$ is determined by the intelligent cluster analyzer as described with reference to FIGS. 5 and 8.

The advantages of the foregoing equalization receivers according to the embodiments of the invention are manifold. In particular, a conventional equalization receiver employs a conventional equalizer to equalize the overall channel response, and thus may fail to work for large delay spread environment due to much noise increase, divergence problems and implementation difficulty because of structural complexity. An equalization receiver according to an embodiment of the invention, however, operates by dividing the overall long delay wireless channel into several short delay subchannels, with which the IFI and MAI are suppressed through short equalizers for equalizing each short delay subchannel, and path diversity is achieved through the combination of the outputs from all short equalizers.

An example is provided hereinafter for comparing the complexity of the conventional equalization receiver and equalization receiver according to an embodiment of the invention. According to the EQ model shown in FIG. 12, there are six equally time-delayed rays, and the maximum access delay is 16 µs, which corresponds to L=61 for chip rate of 3.84 Mcps. If six physical channels (M=6) are available, then in the conventional equalization receiver there is required ML=366 filter taps for equalization of the overall wireless channel response. To implement the conventional equalization receiver with such a large number of taps is not only complicated, but also suffers from the problems of slow convergence and algorithm divergence. However, in the equalizer receiver with intelligent cluster analysis according to an embodiment of the invention, the equalizer parameters are chosen as: the number of SEs C=6; the filter length $\tilde{G}=1$; and the reference timing, $u_k=\tau_k$, k=0, . . . , 5. Therefore, six short equalizers are required, and each short equalizer consists of only six equalizer taps. In this manner, the total equalization length is 36. Since each short equalizer works independently from each other, it is easy to guarantee the convergence of a short equalizer with six taps. Also, if the DMI method is used to calculate the equalizer coefficients for the short equalizers, only the inversion of single 6×6 matrix is required, which further simplifies the computation.

In the foregoing manner, CDMA downlink receivers that suppress IFI and MAI, employ a simple receiver structure, and apply a fast convergence algorithm for addressing the foregoing problems are described. Although only a number of embodiments of the invention are disclosed, it will be apparent to one skilled in the art in view of this disclosure that numerous changes and/or modification can be made without departing from the scope and spirit of the invention.

The invention claimed is:

1. A code division multiple access downlink receiver for providing wireless communication via a wireless channel between a base station and a mobile station in which the receiver is implemented, the receiver comprising:
   a plurality of subchannels whereof each conveys at least one signal received from the base station;
   a cell searcher for receiving signals in the plurality of subchannels and retrieving therefrom a common code relating to a cell;
   a code generator for generating a set of common and dedicated codes relating to at least one communication channel using the output of the cell searcher; and
   a plurality of equalizers for receiving the code generator output and equalizing the received signals in the plurality of subchannels, each of the plurality of equalizers includes a plurality of filters, each of the plurality of filters corresponds to each of the plurality of subchannels,
   the length of each of the plurality of filters is lesser than the length of each of the plurality of subchannels.

2. The receiver as in claim 1, wherein each of the plurality of equalizers is provided a reference timing for operation.

3. The receiver as in claim 2, wherein each of the plurality of equalizers is of length G determined by:

$$G \geq (L-1)/(M-1)$$

wherein L is the length of one of the plurality of subchannels and M is the number of the plurality of subchannels.

4. The receiver as in claim 3, further comprising a time alignment means for performing time alignment on one of the output from the plurality of equalizers and the received signals in the plurality of subchannels, wherein when time alignment is performed on the output from the plurality of equalizers each of the plurality of equalizers is provided with a unique reference timing for operation, and when time alignment is performed on the received signals the plurality of equalizers equalize time-aligned received signals and the plurality of equalizers is provided with the same reference timing for operation.

5. The receiver as in claim 4, further comprising a combiner to combine one of the outputs from the time-alignment means and the plurality of equalizers.

6. The receiver as in claim 5, further comprising a despreader to despread the combined outputs from the combiner.

7. The receiver as in claim 4, further comprising a despreader to despread one of the outputs from the time-alignment means and the plurality of equalizers.

8. The receiver as in claim 7, further comprising a combiner to combine the despread outputs from the despreader.

9. The receiver as in claim 4, wherein each unique reference timing is dependent on the operation of a path searcher, wherein the path searcher performs a search for multiple paths by which the at least one signal arrives at the receiver using the received signals in the plurality of subchannels and generates each unique reference timing therefrom.

10. The receiver as in claim 4, wherein each unique reference timing is predetermined.

11. The receiver as in claim 4, further including an intelligent cluster analyzer, wherein each unique reference timing is dependent on the operation of the intelligent cluster analyzer wherein the intelligent cluster analyzer divides the received signals into at least one ray cluster and generates each unique reference timing.

12. The receiver as in claim 11, wherein the intelligent cluster analyzer further determines the number of the plurality of equalizers.

13. The receiver as in claim 12, wherein the intelligent cluster analyzer further determines the length of the plurality of filters according to:

$$M\tilde{G} \geq P(Q+\tilde{G}-1)$$

wherein P is the number of the at least one ray cluster and Q is the maximum channel length relating to the at least one ray cluster.

14. The receiver as in claim 13, further including a power-delay profile estimator for estimating the power delay profile of the wireless channel.

15. The receiver as in claim 14, wherein the intelligent cluster analyzer generates each unique reference timing, and determines the number of the plurality of equalizers and length of the plurality of filters using the power-delay profile of the wireless channel estimated by the power delay profile estimator.

16. The receiver as in claim 15, wherein the power-delay profile estimator is capable of estimating power-delay profiles of the wireless channel relating to hilly terrains, typical urban, or equalization test models.

17. In a code division multiple access downlink receiver, a method for providing wireless communication via a wireless channel between a base station and a mobile station in which the receiver is implemented, the method comprising the steps of:

provipling a plurality of subchannels whereof each conveys at least one signal received from the base station;

receiving using a cell searcher signals in the plurality of subchannels and retrieving therefrom a common code relating to a cell;

generating using a code generator a set oil common and dedicated codes relating to at least one communication channel using the output of the cell searcher; and using a plurality of equalizers for receiving the code generator output and equalizing the received signals in the plurality of subchannels, each of the plurality of equalizers includes a plurality of filters, each of the plurality of filters corresponds to each of the plurality of subchannels, the length of each of the plurality of filters is lesser than the length of each of the plurality of subchannels.

18. The method as in claim 17, further comprising the step of providing each of the plurality of equalizers with a reference timing for operation.

19. The method as in claim 18, further comprising the step of determining the length G of each of the plurality of equalizers by:

$$G \geq (L-1)/(M-1)$$

wherein L is the length of one of the plurality of subchannels and M is the number of the plurality of subchannels.

20. The method as in claim 19, further comprising the step of performing time alignment using time alignment means on one of the output from the plurality of equalizers and the received signals in the plurality of subchannels, wherein when time alignment is performed on the output from the plurality of equalizers each of the plurality of equalizers is provided with a unique reference timing for operation, and when time alignment is performed on the received signals the plurality of equalizers equalize time-aligned received signals and the plurality of equalizers is provided with the same reference timing for operation.

21. The method as in claim 20, further comprising the step of combining using a combiner one of the outputs from the time-alignment means and the plurality of equalizers.

22. The method as in claim 21, further comprising the step of despreading using a despreader the combined outputs from the combiner.

23. The method as in claim 20, wherein the step of providing each unique reference timing is dependent on the operation of a path searcher, wherein the path searcher performs a search for multiple paths by which the at least one signal arrives at the method using the received signals in the plurality of subchannels and generates each unique reference timing therefrom.

24. The method as in claim 20, wherein the step of providing each unique reference timing comprises the step of providing each unique reference which is predetermined.

25. The method as in claim 20, further comprising the step of performing intelligent cluster analysis using an intelligent cluster analyzer, wherein each unique reference timing is dependent on the operation of the intelligent cluster analyzer wherein the intelligent cluster analyzer divides the received signals into at least one ray cluster and generates each unique reference timing.

26. The method as in claim 25, wherein the step of performing intelligent cluster analysis using the intelligent cluster analyzer comprises the step of further determining the number of the plurality of equalizers.

27. The method as in claim 26, wherein the step of performing intelligent cluster analysis using the intelligent cluster analyzer further comprises the step of further determining the length of the plurality of filters according to:

$$M\tilde{G} \geq P(Q+\tilde{G}-1)$$

wherein P is the number of the at least one ray cluster and Q is the maximum channel length relating to the at least one ray cluster.

28. The method as in claim 27, further including the step of estimating the power-delay profile of the wireless channel using a power delay profile estimator.

29. The method as in claim 28, wherein the step of performing intelligent cluster analyzer using the intelligent cluster analyzer further comprises the steps of:

generating each unique reference timing, and determining the number of the plurality of equalizers and length of the plurality of filters using the power-delay profile of the wireless channel estimated by the power delay profile estimator.

30. The method as in claim 29, wherein the step of estimating the power-delay profile comprises the step of estimating power-delay profiles of the wireless channel relating to hilly terrains, typical urban, or equalization test models.

31. The method as in claim 19, further comprising the step of despreading using a despreader one of the outputs horn the time-alignment means and the plurality of equalizers.

32. The method as in claim 31, further comprising the step of combining using a combiner the despread outputs from the despreader.

* * * * *